(12) United States Patent
Kiffer et al.

(10) Patent No.: US 12,180,059 B2
(45) Date of Patent: Dec. 31, 2024

(54) AUTOMATED CONTAINER FILL LINE WITH EXPERT SYSTEM

(71) Applicant: SWIMC LLC, Cleveland, OH (US)

(72) Inventors: Jeremy J. Kiffer, Berea, OH (US); Michael W. Bigach, Cleveland, OH (US); Sergio Cordeiro, Belo Horizonte MG (BR); Flavio Augusto Gomes Lacerda, Belo Horizonte MG (BR)

(73) Assignee: SWIMC LLC, Cleveland, OH (US)

(\*) Notice: Subject to any disclaimer, the term of this patent is extended or adjusted under 35 U.S.C. 154(b) by 735 days.

(21) Appl. No.: 17/396,066

(22) Filed: Aug. 6, 2021

(65) Prior Publication Data

US 2023/0038721 A1 Feb. 9, 2023

(51) Int. Cl.
*G05B 13/02* (2006.01)
*B67D 3/00* (2006.01)

(52) U.S. Cl.
CPC ......... *B67D 3/0003* (2013.01); *G05B 13/028* (2013.01)

(58) Field of Classification Search
CPC ............................ B67D 3/0003; G05B 13/028
USPC .......................................................... 700/49
See application file for complete search history.

(56) References Cited

U.S. PATENT DOCUMENTS

| | | |
|---|---|---|
| 4,992,952 A | 2/1991 | Sasaki |
| 5,119,318 A | 6/1992 | Paradies et al. |
| 5,163,484 A | 11/1992 | Howlett et al. |
| 5,203,387 A | 4/1993 | Howlett et al. |
| 5,268,849 A | 12/1993 | Howlett et al. |
| 5,365,722 A | 11/1994 | Edwards et al. |
| 5,623,976 A | 4/1997 | Muscara |
| 6,308,499 B1 | 10/2001 | Takada et al. |
| 6,494,608 B1 | 12/2002 | Retamal et al. |
| 6,627,006 B1 | 9/2003 | Bartik-Himmler et al. |
| 7,497,237 B2 | 3/2009 | Till |
| 7,571,122 B2 | 8/2009 | Howes |
| 7,698,021 B2 | 4/2010 | Hughes et al. |
| 7,725,976 B1 | 6/2010 | Crank et al. |
| 7,865,264 B2 | 1/2011 | Hughes et al. |
| 8,235,000 B2 | 8/2012 | Spangler et al. |
| 9,783,401 B2 | 10/2017 | Cavazza et al. |
| 9,969,084 B2 | 5/2018 | Danko |
| 10,124,356 B2 | 11/2018 | Johnson |
| 10,125,001 B2 | 11/2018 | Führer |
| 10,214,406 B2 | 2/2019 | Dicarlo et al. |
| 11,416,369 B1 * | 8/2022 | Trapani ............... G06F 11/3457 |
| 2001/0017023 A1 * | 8/2001 | Armington ............. B65B 55/20 53/472 |
| 2002/0007867 A1 | 1/2002 | Takada et al. |
| 2004/0025972 A1 | 2/2004 | Bartik-Himmler et al. |
| 2006/0283145 A1 | 12/2006 | Weisgerber et al. |
| 2009/0038271 A1 | 2/2009 | Nottingham et al. |
| 2010/0114365 A1 | 5/2010 | Sudolcan et al. |
| 2010/0276028 A1 | 11/2010 | Sangi et al. |
| 2015/0332190 A1 | 11/2015 | Zoelfl et al. |

(Continued)

*Primary Examiner* — Jigneshkumar C Patel
(74) *Attorney, Agent, or Firm* — Shumaker & Sieffert, P.A.

(57) ABSTRACT

An automated container fill line system comprises a container fill line configured to transport a plurality of containers at a fill line speed, and a filler configured to dispense a material into each of the containers individually and sequentially. An Expert System is configured to control the container fill line speed using a set of hierarchical rules and one or more machine learning models associated with equipment of the container fill line.

29 Claims, 16 Drawing Sheets

(56) References Cited

U.S. PATENT DOCUMENTS

| | | |
|---|---|---|
| 2016/0089643 A1 | 3/2016 | Schuhbeck et al. |
| 2017/0028417 A1 | 2/2017 | Johnson |
| 2017/0274576 A1 | 9/2017 | Hahn |
| 2018/0266288 A1 | 9/2018 | Butterworth et al. |
| 2020/0049632 A1* | 2/2020 | Weinstein .......... G01N 21/3563 |
| 2020/0166909 A1 | 5/2020 | Noone et al. |
| 2020/0269268 A1 | 8/2020 | Taube et al. |
| 2023/0135918 A1* | 5/2023 | Ishiguro ................. B67C 3/007 53/136.1 |

* cited by examiner

US 12,180,059 B2

AUTOMATED CONTAINER FILL LINE WITH EXPERT SYSTEM

TECHNICAL FIELD

This disclosure relates generally to systems and methods for controlling an automated container fill line configured to automatically fill containers with a material.

BRIEF SUMMARY

Embodiments of the disclosure are directed to a method implemented by an automated container fill line system comprising transporting a plurality of containers along a container fill line at a fill line speed. The method comprises dispensing a material into each of the containers individually and sequentially. The method also comprises controlling the container fill line speed by an Expert System using a set of hierarchical rules and one or more machine learning models associated with equipment of the container fill line.

Embodiments of the disclosure are directed to an automated container fill line system comprising a container fill line configured to transport a plurality of containers at a fill line speed. A filler is configured to dispense a material into each of the containers individually and sequentially. An Expert System is configured to control the container fill line speed using a set of hierarchical rules and one or more machine learning models associated with equipment of the container fill line.

Embodiments of the disclosure are directed to a non-transient computer readable medium containing program instructions for causing a computer-implemented Expert System to perform the method of controlling transporting of a plurality of containers along a container fill line at a fill line speed, controlling dispensing of a material into each of the containers individually and sequentially, and controlling the container fill line speed using a set of hierarchical rules and one or more machine learning models associated with equipment of the container fill line.

The above summary is not intended to describe each disclosed embodiment or every implementation of the present disclosure. The figures and the detailed description below more particularly exemplify illustrative embodiments.

BRIEF DESCRIPTION OF DRAWINGS

Throughout the specification reference is made to the appended drawings wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION OF ILLUSTRATIVE EMBODIMENTS

Embodiments of the disclosure are directed to an Expert System configured to control an automated container fill line. According to various embodiments, the automated container fill line is configured to fill containers with a material. Representative materials include, but are not are not limited to, a liquid material (e.g., paint, coatings), a semi-liquid material (e.g., caulk, a paste), a gelatinous material, a solid material (e.g., a powder), an aerosolized material, a substance, a chemical, a compound, a product or a by-product. Representative materials include petroleum-based products, food, and food grade products. Other materials are contemplated, it being understood that the disclosed systems and methods are not limited to filling containers only with the representative materials disclosed herein.

An Expert System of the present disclosure includes, or is operatively coupled to, a module comprising one or more machine learning models. This module is referred to herein as "the Sentinel Module" for convenience. It is understood that the Sentinel Module represents a collections of machine learning models that can be stored in, and hosted from, a single memory, single processing environment or single location or any number of memories, processing environments or locations.

A machine learning model of the present disclosure can be implemented as a file that has been trained to recognize certain types of patterns for a particular piece of equipment of an automated container fill line system. For example, a particular model can be trained over a set of data associated with a particular piece of container fill line equipment, providing it with an algorithm that it can use to reason over and learn from those data. Once trained, a machine learning model of the present disclosure can be used to reason over data that the model hasn't seen before, and make predictions about such data. The machine learning model (or models) associated with each piece of equipment returns these predictions to inform the Expert System as to the operational status and behavior of the container fill line equipment and overall operation (speed, throughput, efficiency, etc.)

Figure 1:
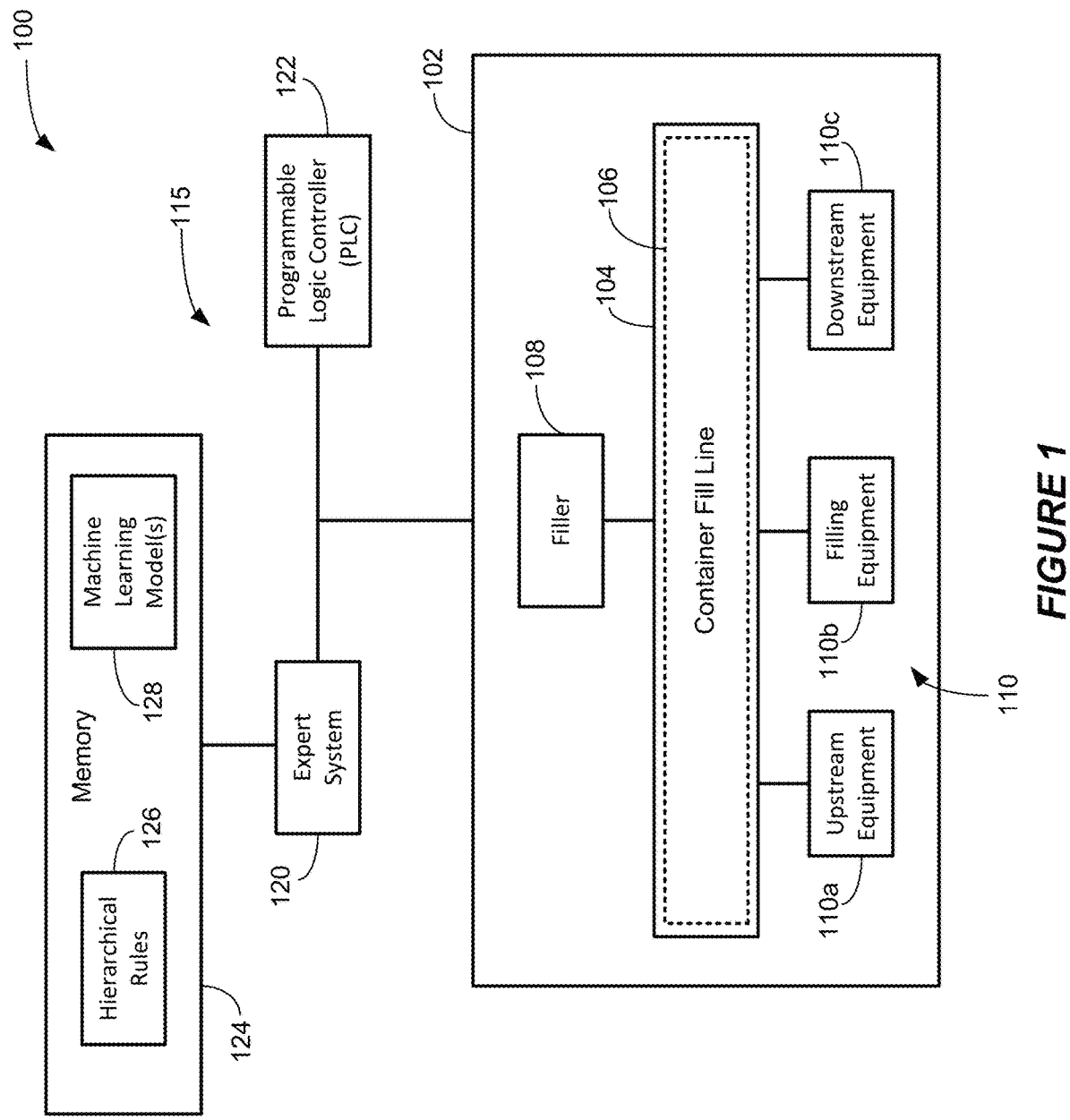
FIG. 1 illustrates an automated fill line system in accordance with various embodiments.

FIG. 1 illustrates an automated fill line system in accordance with various embodiments. The automated fill line system 100 includes an automated fill line 102 operably coupled to a control system 115. The automated fill line 102 includes a container fill line 104 which includes a line drive mechanism 106. The container fill line 104, with assistance from the line drive mechanism 106 and various known sensors 105, is configured to transport a plurality of containers along the container fill line 104 at a specified fill line speed. The specified fill line speed can be a requested speed, and maximum speed (e.g., maximum stable speed), an optimal speed, a speed established during prior operation (e.g., for a prior equivalent order) or a sub-optimal speed (e.g., a speed<optimal speed), for example. The fill line speed is typically measured in terms of containers per minute (CPM), which typically corresponds to containers filled per minute, but can be measured in other terms.

The automated fill line 102 includes a Filler 108 configured to dispense a material into each of the containers individually and sequentially. For purposes of illustration and not of limitation, the material can comprise at least one of a liquid paint or coating (e.g., a stain). For example, the automated fill line 102 can be configured as a paint container fill line in which liquid paint is dispensed by the Filler 108 into each of the containers individually and sequentially during operation.

The control system 115 includes an Expert System 120 operably coupled to a controller 122, such as a programmable logic controller (PLC). The Expert System 120 includes one or more processors operably coupled to memory 124. The memory 124 is configured to store hierarchical rules 126 and one or more machine learning models 128. The machine learning models 128 can be stored in and/or hosted by a Sentinel Module 128a shown in FIG. 7 and elsewhere. The hierarchical rules 126 and machine learning models 128 can reside in the same memory or separate memories, and can be operated on or hosted by the same or different processors. Each of the machine learning models is associated with equipment 110 of the automated fill line 102. The Expert System 120 is configured to control the fill line speed of the container fill line 104 using a set of the hierarchical rules 126 and one or more of the machine learning models 128.

Embodiments of the disclosure are defined in the claims. However, below there is provided a non-exhaustive listing of non-limiting examples. Any one or more of the features of these examples may be combined with any one or more features of another example, embodiment, or aspect described herein.

Example Ex1. A method implemented by an automated container fill line system comprises transporting a plurality of containers along a container fill line at a fill line speed, dispensing a material into each of the containers individually and sequentially, and controlling the container fill line speed by an Expert System using a set of hierarchical rules and one or more machine learning models associated with equipment of the container fill line.

Example Ex2. The method according to Ex1, wherein the Expert System controls the container fill line speed in response to at least a capacity of equipment of the container fill line to process containers and a capacity of a filler of the container fill line to fill the containers while the containers are transported along the container fill line at the container fill line speed.

Example Ex3. The method according to Ex1 or Ex2, comprising detecting, by the Expert System, whether the equipment is experiencing anomalous behavior using the one or more machine learning models.

Example Ex4. The method according to one or more of Ex1 to Ex3, wherein the Expert System adjusts the container fill line speed by increasing the container fill line speed in response to detecting non-violation of the hierarchical rules and detecting an absence of anomalous equipment behavior, and decreasing the container fill line speed in response to detecting violation of one or more of the hierarchical rules or detecting presence of anomalous equipment behavior.

Example Ex5. The method according to one or more of Ex1 to Ex4, wherein increasing the container fill line speed comprises increasing a current fill line speed to achieve a throughput equivalent to a requested or maximum number of containers per minute processed by the container fill line, and decreasing the container fill line speed comprises reducing the current fill line speed to achieve a throughput equivalent to a number of containers per minute ranging from zero to less than the requested or maximum number of containers per minute.

Example Ex6. The method according to one or more of Ex1 to Ex5, wherein the one or more machine learning models define models trained using historical equipment speed data acquired during past operation of the equipment.

Example Ex7. The method according to one or more of Ex1 to Ex6, wherein the equipment comprises upstream equipment situated upstream of a filler of the container fill line and downstream equipment situated downstream of the filler, and the one or more machine learning models are associated with the upstream equipment and the downstream equipment.

Example Ex8. The method according to one or more of Ex1 to Ex7, wherein the set of hierarchical rules comprises a first set of rules directed to fill line process values that vary dynamically and a second set of rules directed to constant parameter values.

Example Ex9. The method according to one or more of Ex1 to Ex8, wherein the Expert System integrates one or more new hierarchical rules into the set of hierarchical rules to provide for enhanced adjustment to the container fill line speed.

Example Ex10. The method according to one or more of Ex1 to Ex9, comprising one or more of writing alerts generated by the Expert System to a database and communicating the alerts from the database to a user interface in response to a user request or a system request, writing, by the Expert System to the database, events of predetermined relevance and information associated with the events, and writing, by the Expert System to the database, anomalies of predetermined relevance and information associated with the anomalies.

Example Ex11. The method according to one or more of Ex1 to Ex10, comprising calculating, by the Expert System, statistics during operation of the container fill line and storing the statistics in a memory.

Example Ex12. The method according to one or more of Ex1 to Ex11, wherein the material comprises liquid material or a semi-liquid material.

Example Ex13. The method according to one or more of Ex1 to Ex11, wherein the material comprises a powder or an aerosolized material.

Example Ex14. An automated container fill line system comprises a container fill line configured to transport a plurality of containers at a fill line speed, a filler configured to dispense a material into each of the containers individually and sequentially, and an Expert System configured to control the container fill line speed using a set of hierarchical rules and one or more machine learning models associated with equipment of the container fill line.

Example Ex15. The system according to Ex14, wherein the Expert System is configured to control the container fill line speed in response to at least a capacity of equipment of the container fill line to process containers, and a capacity of a filler of the container fill line to fill the containers while the containers are transported along the container fill line at the container fill line speed.

Example Ex16. The system according to Ex14 or Ex15, wherein the Expert System is configured to detect whether the equipment is experiencing anomalous behavior using the one or more machine learning models.

Example Ex17. The system according to one or more of Ex14 to Ex16, wherein the Expert System is configured to adjust the container fill line speed by increasing the container fill line speed in response to detecting non-violation of the hierarchical rules and detecting an absence of anomalous equipment behavior, and decreasing the container fill line speed in response to detecting violation of one or more of the hierarchical rules or detecting presence of anomalous equipment behavior.

Example Ex18. The system according to one or more of Ex14 to Ex17, wherein the Expert System is configured to increase the container fill line speed by increasing a current fill line speed to achieve a throughput equivalent to a requested or maximum number of containers per minute processed by the container fill line, and decrease the container fill line speed by reducing the current fill line speed to achieve a throughput equivalent to a number of containers per minute ranging from zero to less than the requested or maximum number of containers per minute.

Example Ex19. The system according to one or more of Ex14 to Ex18, wherein the one or more machine learning models define models trained using historical equipment speed data acquired during past operation of the equipment.

Example Ex20. The system according to one or more of Ex14 to Ex19, wherein the equipment comprises upstream equipment situated upstream of a filler of the container fill line and downstream equipment situated downstream of the filler, and the one or more machine learning models are associated with the upstream equipment and the downstream equipment.

Example Ex21. The system according to one or more of Ex14 to Ex20, wherein the set of hierarchical rules comprises a first set of rules directed to fill line process values that vary dynamically and a second set of rules directed to constant parameter values.

Example Ex22. The system according to one or more of Ex14 to Ex21 wherein the Expert System is configured to integrate one or more new hierarchical rules into the set of hierarchical rules to provide for enhanced adjustment to the container fill line speed.

Example Ex23. The system according to one or more of Ex14 to Ex22, wherein the Expert System is operably coupled to a database and configured to one or more of write alerts to the database and communicate the alerts from the database to a user interface in response to a user request or a system request, write events of predetermined relevance and information associated with the events to the database, and write anomalies of predetermined relevance and information associated with the anomalies to the database.

Example Ex24. The system according to one or more of Ex14 to Ex23, wherein the Expert System is configured to calculate statistics during operation of the container fill line and store the statistics in a memory.

Example Ex25. The system according to one or more of Ex14 to Ex24, wherein the material comprises liquid material or a semi-liquid material.

Example Ex26. The system according to one or more of Ex14 to Ex24, wherein the material comprises a powder or an aerosolized material.

Example Ex27. A non-transient computer readable medium containing program instructions for causing a computer-implemented Expert System to perform the method of controlling transporting of a plurality of containers along a container fill line at a fill line speed, controlling dispensing of a material into each of the containers individually and sequentially, and controlling the container fill line speed using a set of hierarchical rules and one or more machine learning models associated with equipment of the container fill line.

Example Ex28. The non-transient computer readable medium according to Ex27, wherein the Expert System controls the container fill line speed in response to at least a capacity of equipment of the container fill line to process unfilled containers, and a capacity of a filler of the container fill line to fill the containers while the containers are transported along the container fill line at the container fill line speed.

Example Ex29. The non-transient computer readable medium according to Ex27 or Ex28, comprising detecting, by the Expert System, whether the equipment is experiencing anomalous behavior using the one or more machine learning models.

Example Ex 30. The non-transient computer readable medium according to one or more of Ex27 to Ex29, wherein the Expert System is configured to adjust the container fill line speed by increasing the container fill line speed in response to detecting non-violation of the hierarchical rules and detecting an absence of anomalous equipment behavior, and decreasing the container fill line speed in response to detecting violation of one or more of the hierarchical rules or detecting presence of anomalous equipment behavior.

Example Ex31. The non-transient computer readable medium according to one or more of Ex27 to Ex30, wherein the Expert System is configured to increase the container fill line speed by increasing a current fill line speed to achieve a throughput equivalent to a requested or maximum number of containers per minute processed by the container fill line, and decrease the container fill line speed by reducing the current fill line speed to achieve a throughput equivalent to a number of containers per minute ranging from zero to less than the requested or maximum number of containers per minute.

Figure 2:
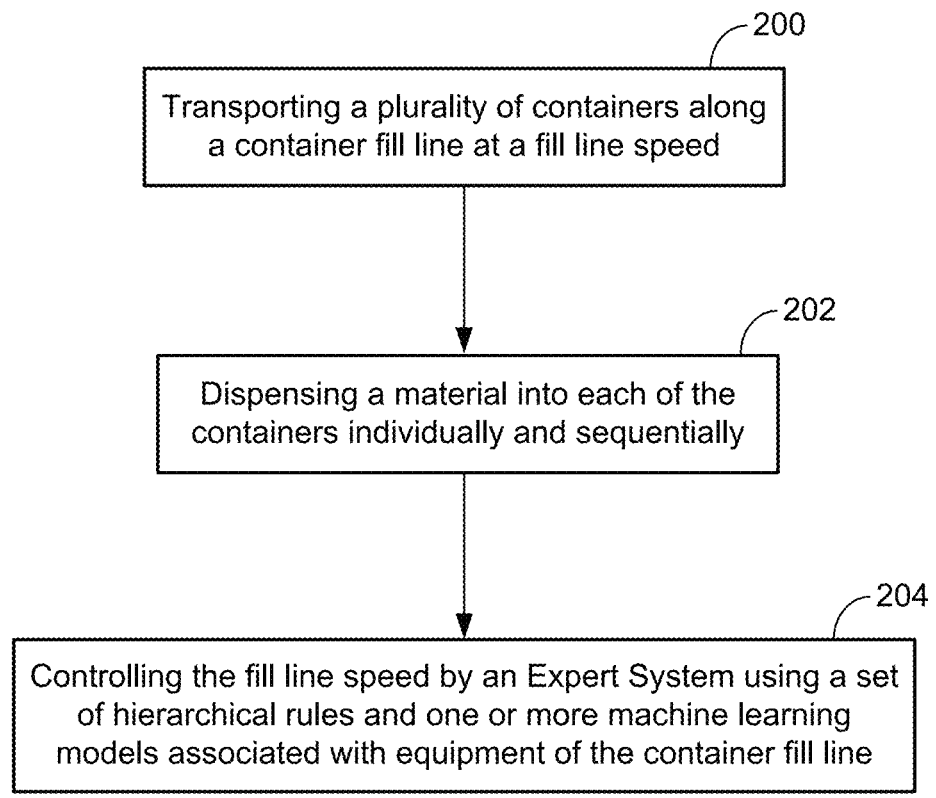
FIG. 2 illustrates a method implemented by the automated fill line system shown in FIG. 1.

FIG. 2 illustrates a method implemented by the automated fill line system 100 shown in FIG. 1 in accordance with some embodiments. The method shown in FIG. 2 involves transporting 200 a plurality of containers along the container fill line 104 at a specified fill line speed. The method also involves dispensing 202 a material into each of the containers individually and sequentially. The method further involves controlling 204 the fill line speed by the Expert System 120 using a set of the hierarchical rules 126 and one or more of the machine learning models 128 associated with equipment 110 of the container fill line 104.

Figure 3:
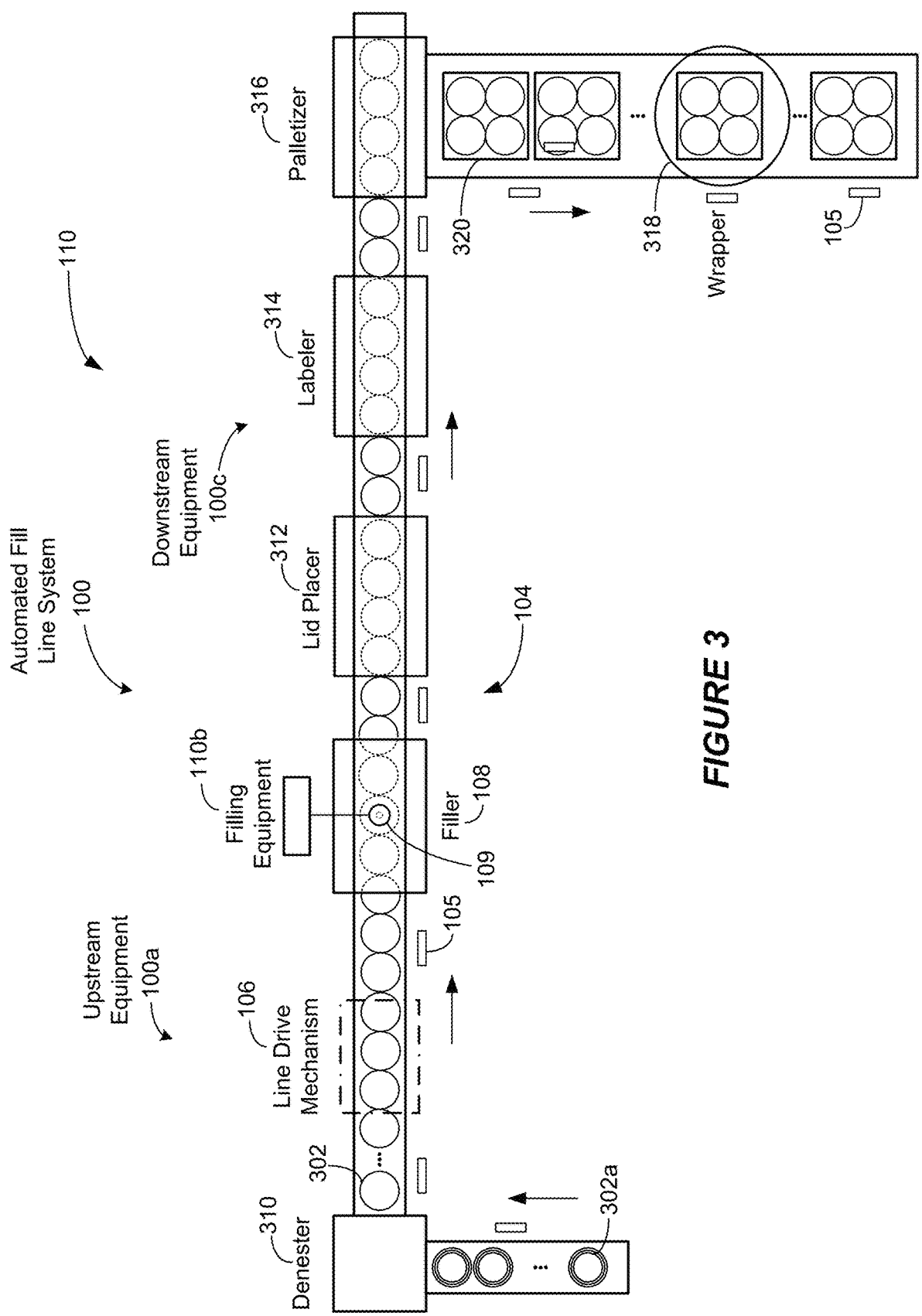
FIG. 3 illustrates additional details of the automated fill line system shown in FIG. 1.

FIG. 3 illustrates additional details of the automated fill line system 100 shown in FIG. 1 in accordance with various embodiments. The layout of the automated fill line system 100 shown in FIG. 3 is a simplified, generalized illustration for purposes of explanation. It is understood that an actual automated fill line system layout will likely differ from that shown in the figures, and that such layout variations are contemplated in the present disclosure.

The automated fill line system 100 shown in FIG. 3 includes various equipment 110 configured and controlled to operate cooperatively as components of the container fill line 104. The equipment 110 is controlled and monitored by the Expert System 120 in cooperation with the PLC 122. For purposes of convenience, the equipment 110 is described as upstream equipment 110a, filling equipment 110b, and downstream equipment 110c. The upstream equipment 110a defines equipment of the container fill line 104 which is situated upstream, or ahead of, the Filler 108. The filling equipment 110b defines equipment of the container fill line 104 which is situated at or around the Filler 108. The downstream equipment 110c defines equipment of the container fill line 104 which is situated downstream, or subsequent to, the Filler 108. It is understood that equipment disclosed herein may be shown as upstream equipment, but may be incorporated in the container fill line 104 as downstream equipment (and vice versa). It is to be understood that the equipment disclosed herein is representative of equipment used in a particular type of container fill line (e.g., a paint or coating container fill line), and that other types of equipment are contemplated for use with other types of container fill lines.

According to some embodiments, the container fill line is configured to process a powder material (e.g., a solid particulate material). In such embodiments, the upstream equipment 110a includes manufacturing equipment that processes solid material into powder prior to transporting the powder to a dispensing station for filling containers with the powder. A typical manufacturing process involves a mixer configured to mix specified solid materials and quantities of such solid materials, followed by an extruder configured to heat the mixed solid material into a sheet or stream. The solid material sheet or stream is deposited on a conveyor, flattened, and then chilled. A chipper breaks up the sheet or stream of material, and the chips of solid material are transported to a mill which grinds down the solid material chips into powder. The powder can then be dispensed into individual containers individually and sequentially in a manner disclosed herein. A container fill line 104 which includes upstream powder manufacturing equipment 110a can be operated in a continuous or semi-continuous manner via the Expert System 120 depending on the type and configuration of the manufacturing equipment and processing requirements.

In the representative examples shown in FIG. 3, the upstream equipment 110a includes a Denester 310 configured to separate individual containers 302 from a nested or stacked set 302a of containers 302. The filling equipment 110b includes a pumping system configured to supply material (e.g., paint or a coating) stored in one or more tanks to the Filler 108. The Filler 108 includes a Filler bowl 109 according to some embodiments. The Filler 108 is controlled to regulate the Filler bowl 109 in a manner described below. The downstream equipment 110c includes a Lid Placer 312, a Labeler 314, a Palletizer 316, and a Wrapper 318. The Lid Placer 312 is configured to automatically place a lid on each of the filled containers 302 exiting the Filler 108. The Labeler or Label Placer 314 is configured to automatically place a label on each of the filled containers 302 exiting the Lid Placer 312. The Palletizer 316 is configured to automatically place a set of filled containers 302 exiting the Labeler 314 on a pallet. The Wrapper 318 is configured to automatically wrap the palletized filled containers 302 exiting the Palletizer 316 with a plastic wrap.

The line drive mechanism 106 shown in FIG. 3 can include drive components and various sensors 105 distributed along the container fill line 104 (e.g., within and/or between pieces of equipment 110). Typically, the line drive mechanism includes electric motors with conveyance. Various types of sensors 105 are positioned along the container fill line 104 including, for example, photo-reflective detection sensors, ultrasonic proximity sensors, and limit switches (e.g., whisker switches).

Figure 4:
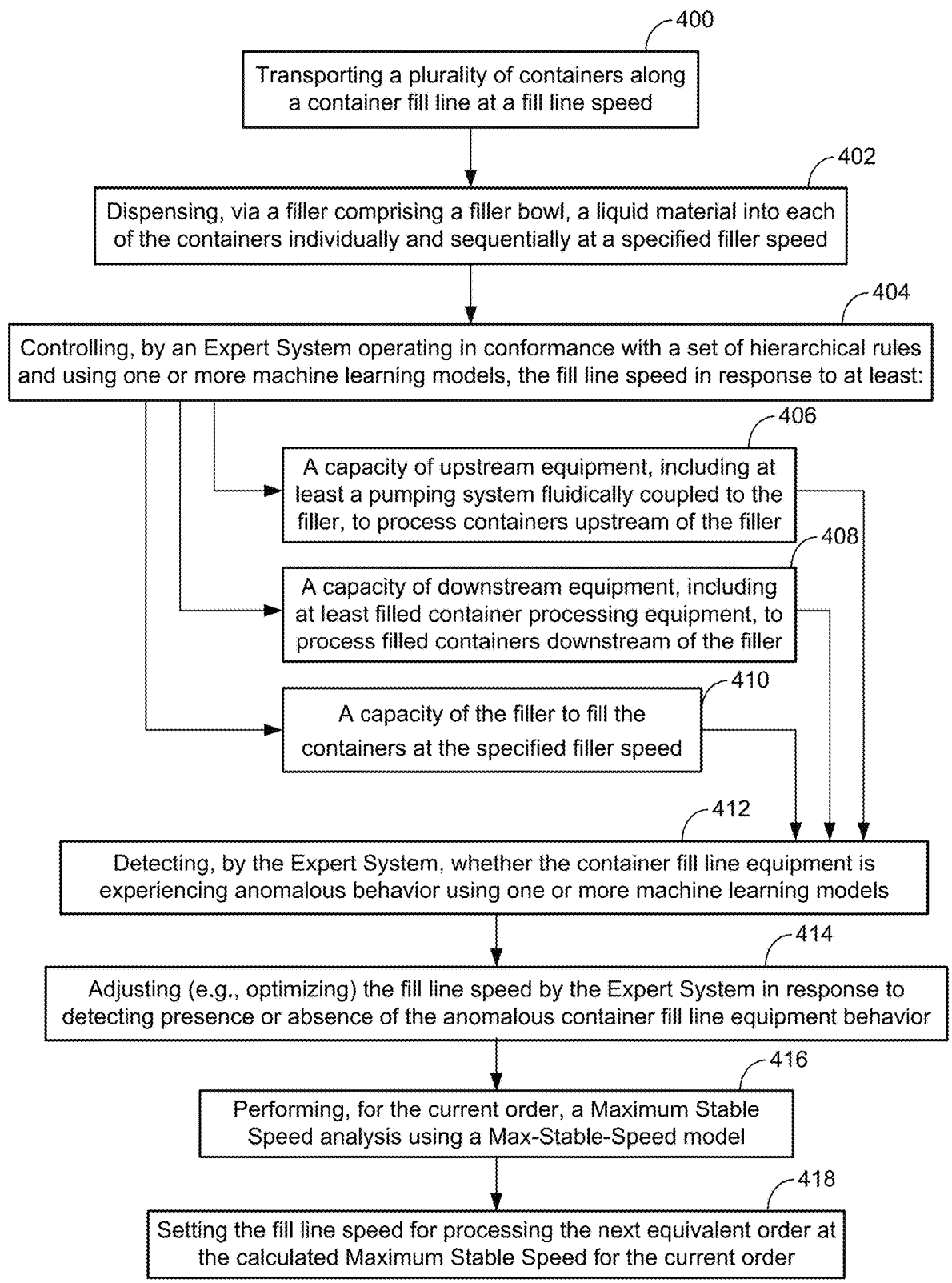
FIG. 4 illustrates a method implemented by the automated fill line system shown in FIG. 3.

FIG. 4 illustrates a method implemented by the automated fill line system 100 shown in FIG. 3 in accordance with some embodiments. The method shown in FIG. 4 involves transporting 400 a plurality of containers 302 along the container fill line at a specified fill line speed. As previously discussed, the specified fill line speed can be a requested speed, and maximum speed (e.g., maximum stable speed), an optimal speed, a speed established during prior operation (e.g., for a prior equivalent order) or a sub-optimal speed (e.g., a speed<optimal speed), for example. The method involves dispensing 402, via the Filler 108 and the Filler bowl 109, a liquid material into each of the containers 302 individually and sequentially at a specified Filler speed (which can be interchangeable with, or equivalent to, fill line speed). The material dispensed into each of the containers 302 can be a paint or coating, for example.

In accordance with some embodiments, the method also involves controlling 404, by an Expert System 120 operating in conformance with a set of hierarchical rules 126 and using one or more machine learning models 128, the fill line speed and in response to the capacity of the equipment 110 of the container fill line 104. For example, the Expert System 120 can be configured to implement a set of hierarchical rules 126 and use one or more machine learning models 128 when controlling a capacity 406 of upstream equipment 110a (e.g., Denester 310), including at least a pumping system fluidically coupled to the Filler 108, to process containers 302 upstream of, or at, the Filler 108. The Expert System 120 can be configured to implement a set of hierarchical rules 126 and use one or more machine learning models 128 when controlling a capacity 408 of downstream equipment 110b (e.g., Lid Placer 312, Labeler 314, Palletizer 316, Wrapper 318) to process filled containers downstream of the Filler 108. The Expert System 120 can be further configured to implement a set of hierarchical rules 126 and one or more machine learning models 128 when controlling a capacity 410 of the Filler 108 to fill the containers 302 at the specified Filler speed.

The method also involves detecting 412, by the Expert System operatively coupled to the equipment 110 and sensors 105 of the container fill line 104, whether the container fill line equipment 110 (e.g., one or more of the upstream equipment 110a, filling equipment 110b, and the downstream equipment 110c) is experience anomalous behavior using the one or more machine learning models 128. The method further involves adjusting 414 (e.g., optimizing) the fill line speed by the Expert System 120 in response to detecting the presence or absence of the anomalous container fill line equipment behavior. In response to detecting presence of the anomalous container fill line equipment behavior, the Expert System can be configured to implement one or more corrective actions (e.g., slowing the line drive mechanism 106 of the container fill line 104, generating user perceivable alerts and/or writing alerts to a database).

The method shown in FIG. 4 also involves performing 416, for a current order, a Maximum Stable Speed analysis using a Maximum Stable Speed model. As will be described in detail hereinbelow, the Maximum Stable Speed model returns a Maximum Stable Speed value to the Expert System 120. The method further involves setting 418 the fill line speed for processing the next equivalent order (e.g., the same order at a later time) at the Maximum Stable Speed calculated for the current order.

Figure 5:
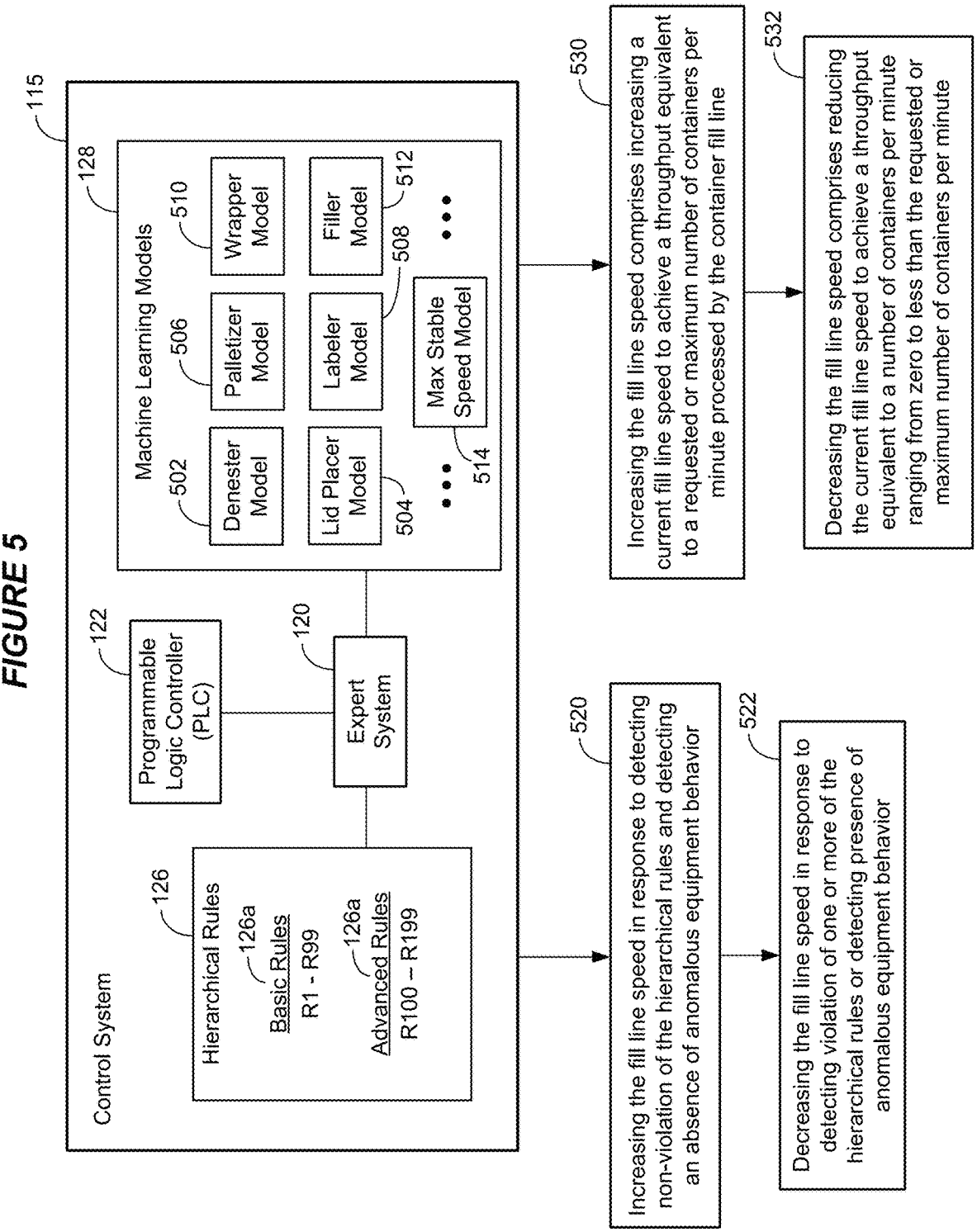
FIG. 5 illustrates components and functionality of a control system configured for use with an automated fill line in accordance with various embodiments.

FIG. 5 illustrates components and functionality of a control system 115 configured for use with an automated fill line in accordance with various embodiments. The control system 115 shown in FIG. 5 includes an Expert System 120 operatively coupled to a PLC 122 and memory 124 configured to store a set of hierarchical rules 126 and machine learning models 128. The hierarchical rules 126 define a tiered or classified ranking of rules which can be implemented by the Expert System 120 in accordance with a prioritized order in response to sensed conditions of the container fill line 104 during operation. The hierarchical rules 126 includes a set of basic rules 126a, which can be numbered as rules R1 through R99, for example. The hierarchical rules 126 also include a set of advanced rules 126b, which can be numbered as rules R100 through R199, for example. The basic rules 126a can define a set of hierarchical rules that constitute fill line process values that vary dynamically. The advanced rules 126b can define a set of hierarchical rules directed to fill line process values that constitute constant parameter values. Examples of the basic rules 126a and the advanced rules 126b are provided in the discussion below.

The machine learning models 128 include at least one model associated with each piece of equipment 110 of the container fill line 104 (e.g., at least one or more pieces of equipment 110 are associated with one or more machine learning models 128). The machine learning models 128 define mathematical models trained using historical equipment operating data acquired during past operation of the equipment 110. For example, the machine learning models 128 define models trained using historical equipment speed data acquired during past operation of the equipment 110. The machine learning models 128 can include, for example, a Denester model 502 associated with the Denester 310, a Lid Placer model 504 associated with the Lid Placer 312, a Palletizer model 506 associated with the Palletizer 316, a Labeler model 508 associated with the Labeler 314, a Wrapper model 510 associated with the Wrapper 320, and a Filler model 512 associated with the Filler 108. It is understood that each piece of equipment 110 need not have an associated machine learning model 128. As previously mentioned, the machine learning models 128 can also include models a Maximum Stable Speed Model 514, which can represent a single model associated with a plurality of different equipment 110 of the container fill line 104.

FIG. 5 further illustrates various functions performed by the control system 115 in accordance with various embodiments. The Expert System 120, in cooperation with the programmable logic controller 122, the set of hierarchical rules 126, and the machine learning models 128, can be configured to increase 520 the fill line speed of the container fill line 104 in response to detecting non-violation of the hierarchical rules 126 and detecting an absence of anomalous equipment behavior using the machine learning models 128. The Expert System 120 can also be configured to decrease 522 the fill line speed in response to detecting violation of one or more of the hierarchical rules 126 or detecting presence of anomalous equipment behavior using the machine learning models 128.

As is also shown in FIG. 5, the Expert System 120, in cooperation with the programmable logic controller 122, the set of hierarchical rules 126, and the machine learning models 128, can be configured to increase 530 the fill line speed by increasing a current fill line speed to achieve a throughput equivalent to a requested or maximum number of containers per minute (CPM) processed by the container fill line 104. The Expert System 120 can also be configured to decrease 532 the fill line speed by reducing the current fill line speed to achieve a throughput equivalent to a number of containers per minute ranging from zero to less than the requested or maximum number of containers per minute, typically in response to detecting one or both of violation of a hierarchical rule and detecting anomalous equipment behavior. As will be discussed below, the Expert System 120, in cooperation with the programmable logic controller 122, the set of hierarchical rules 126, and the machine learning models 128, can be configured to determine a maximum stable speed of the Filler 108 (or the container fill line 104 generally) using the Maximum Stable Speed model 514.

Figure 6:
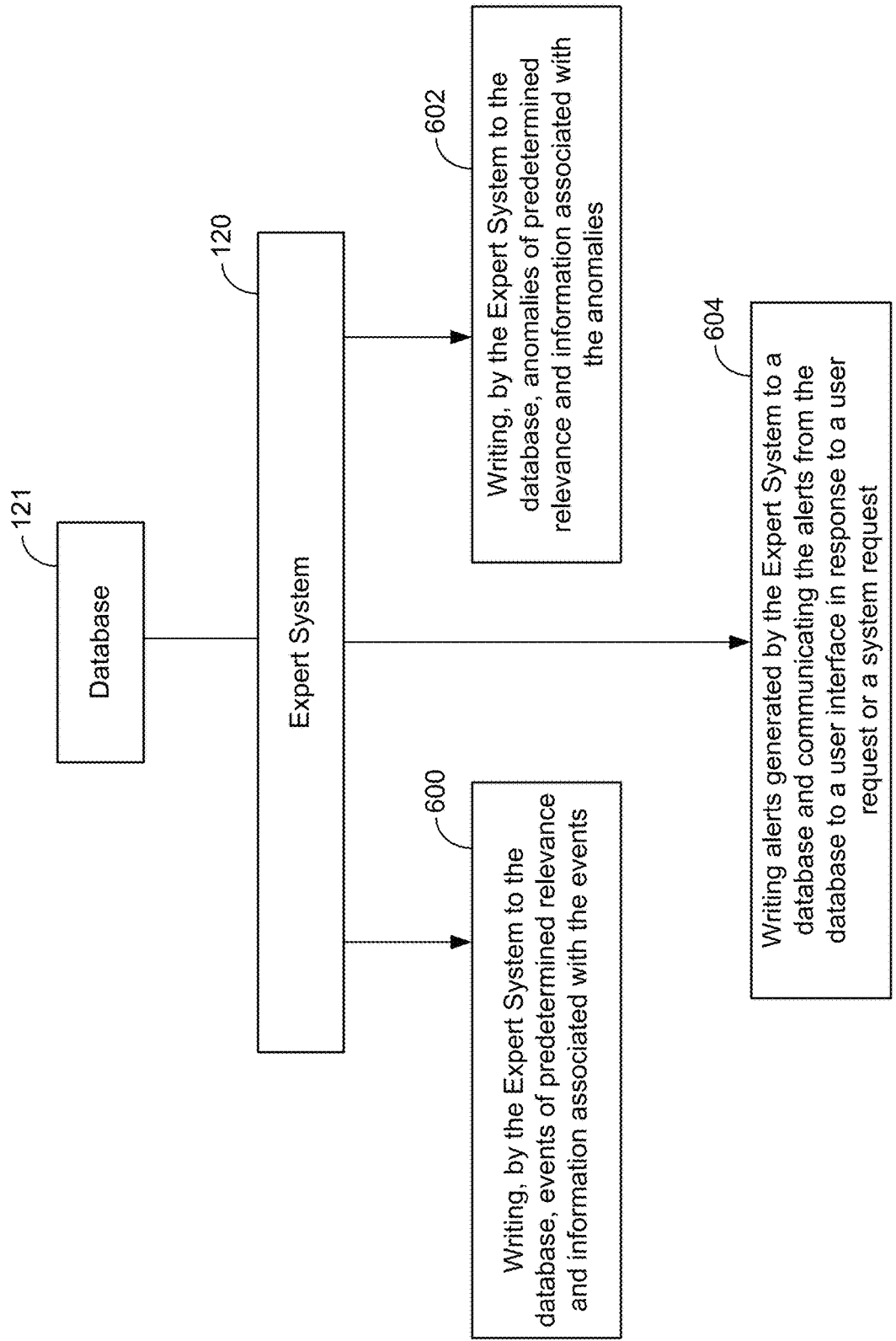
FIG. 6 illustrates various functions performed by the control system in accordance with various embodiments

FIG. 6 illustrates various functions performed by the control system 115 in accordance with various embodiments. The control system 115 can be implemented to monitor operation of the container fill line 104 and associated equipment 108, 110 using various sensors 105, hierarchical rules 126, and machine learning models 128. The control system 115 can be implemented to detect anomalous operation of the container fill line 104 and equipment 108, 110 associated with the container fill line 104. The Expert System 120 can be operatively coupled to a database 121 configured to store and organize events and information relating to normal and abnormal operation of the container fill line 104.

For example, the Expert System 120 can be configured to write 600, to the database 121, events of predetermined relevance and information associated with the events. The Expert System 120 can be configured to write 602, to the database 121, anomalies of predetermined relevance and information associated with the anomalies. The Expert System 120 can also be configured to write 604, to the database 121, alerts generated by the Expert System 604 or other component of the automated fill line 102 and/or communicate the alerts from the database 121 to a user interface in response to a user request or a system request. According to some embodiments, the Expert System 120 can be configured to calculate various performance statistics during operation of the container fill line 104 and store the performance statistics in a memory 124 (e.g., in database 121). Examples of various performance statistics that can be calculated by the Expert System 120 are provided in the discussion below.

In the following discussion, various illustrative embodiments and examples are described that make reference to the following terminology that has particular meaning in the context of such embodiments and examples:

Anomaly or Anomalous behavior—In the context of the Expert System 120, an indication that the container fill line 104 is not performing as fast as it should.

Actual speed—The CURRENT SPEED of the Filler 108 as sent by it to the PLC 122, e.g., as an integer value, with decimals truncated. As such, this value is often 1 CPM below REQUESTED SPEED.

Analysis time—The time the Expert System 120 waits for the PLC 122 to evaluate process conditions before deciding about the current REQUESTED SPEED.

Automatic mode—State of the Filler control system where it accepts a remote set point for the REQUESTED SPEED.

Current speed—The true current speed (in CPM) of the Filler 108; compare to REQUESTED SPEED and to ACTUAL SPEED.

Deadtime interval—The time the Expert System 120 waits for the stabilization of process conditions after commanding a change in REQUESTED SPEED.

DigitalFillLine or Fill Line System database—A database created to store container fill line data in the context of the automated fill line system 100.

Expert System—An application that uses some sort of inference engine to store and use knowledge. The Expert System 120 typically sends set-points to lower level, regulatory control systems.

Good counts—The current number of containers produced, according to the Filler 108 itself.

Limit speed—The maximum value that plant personnel authorize the Expert System 120 to set to REQUESTED SPEED during the processing of an order. This PARAMETER can be adjusted by means of a special screen on a line supervisory system operatively coupled to the Expert System 120.

Manual mode—State of the Filler control system where it does not accept a remote set point for the REQUESTED SPEED; the operator must control speed in this case.

Maximum run rate—The maximum value for the ACTUAL SPEED as evaluated by the Filler control system itself. By convention, for safety reasons, the value used by the Expert System 120 is preferably 2 CPM below the value actually indicated by the Filler 108.

Maximum speed—The maximum value that can be set to REQUESTED SPEED during the processing of an order. It is restricted by LIMIT SPEED, MAXIMUM RUN RATE and TOP SPEED.

Maximum stable speed—The maximum value of REQUESTED SPEED that the Expert System 120 recommended in a continuous fashion for at least 90 seconds in a given order.

Minimum speed—The minimum value that can be set to REQUESTED SPEED during the processing of an order. For example, the Expert System 120 understands that it is not able to control Filler speed at extreme conditions so it does not lower speed when it is already too low.

Minimum top speed—The minimum value that can be set to TOP SPEED during the processing of an order.

Order—A specified number of containers of a particular volume (e.g., 5 gallon pails) to be filled with a specified material.

Figure 7:
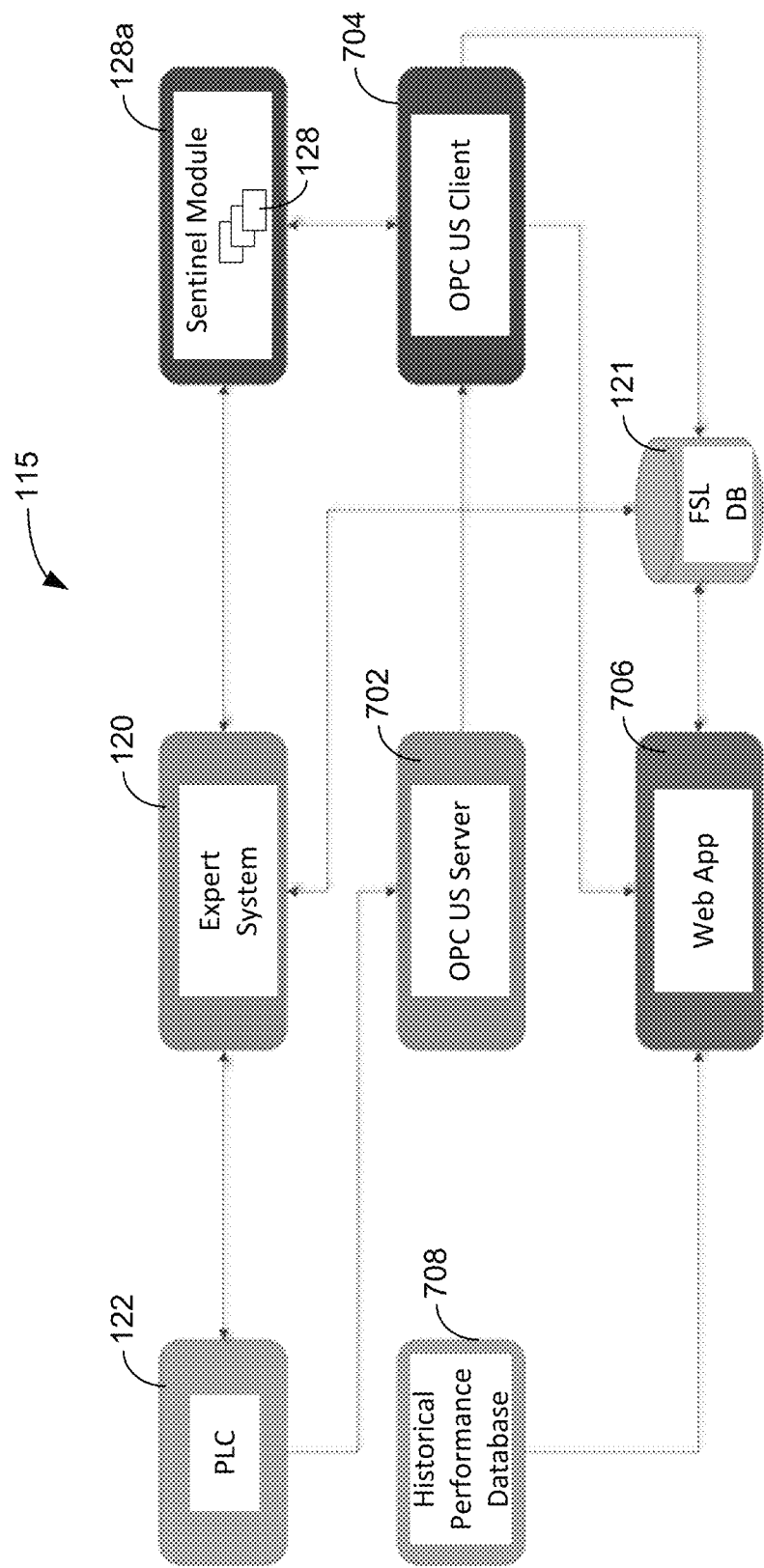
FIG. 7 illustrates a control system of an automated fill line system in accordance with various embodiments.

Order number—The number (e.g., ID) of the current order, as recorded in the historical performance database 708 database shown in FIG. 7.

Parameter—A constant value that is involved in some RULE. Most Parameters are stored as internal tags on an Ignition platform (discussed below), which provides for a degree of configurability to the system.

Requested speed—The desired speed (in CPM) of the Filler 108. This quantity can be determined by the operator (when the Filler 108 is in MANUAL mode) or by the Expert System 120 (when the Filler 108 is in AUTOMATIC mode)

Rule—A predefined logical condition related to a set of process variables and constants (PARAMETERS). When this condition is met, it is said that the rule was FIRED.

Runtime count—The amount of time the order has being processed, as seen by the Expert System 120.

Top speed—The maximum value that the Expert System 120 thinks can be set to REQUESTED SPEED, when overall conditions of the container fill line 104 are taken into account.

FIG. 7 illustrates a control system 115 of an automated fill line system 100 in accordance with various embodiments. The control system 115 illustrated in FIG. 7 includes an Expert System 120 operatively coupled to a PLC 122 and a Sentinel Module 128a which comprises library of machine learning models 128. The Expert System 120 is also operatively coupled to a fill line system database 121. According to the embodiment shown in FIG. 7, the PLC 122 is operatively coupled to an OPC UA (Open Platform Communications Unified Architecture) server 702 which is operatively coupled to an OPC UA client 704. In addition to the OPC UA sever 702, the OPC UA client 704 is operatively coupled to the Sentinel Module 128a, the fill line system database 121, and a web application 706 (e.g., a device or computer configured to execute the web application 706). The web application 706 can be operatively coupled to a number of components including the OPC UA client 704, the fill line system database 121, and a historical performance database 708. Representative operations of the control system 115 illustrated in FIG. 7 are described hereinbelow.

Among other considerations, and according to some embodiments, the Expert System 120 controls the fill line speed of the container fill line 104 in response to at least (1) the capacity of the upstream pumping system (e.g., equipment 110a, 110b) to send liquid material (e.g., paint or a coating) to the Filler 108, (2) the capacity of the downstream equipment (e.g., equipment 110c) to consume the containers (e.g., 5 gallon pails or 1 gallon cans) filled by the Filler 108, and (3) the capacity of the Filler 108 to fill containers within a specified tolerance range (e.g., 6-27 CPM for 5 gallon pails and 30-100 CPM for 1 gallon cans, which varies depending on the manufacturing capabilities and configuration of the container fill line equipment). In some embodiments, to accomplish its task, the Filler 108 has an internal control system that accepts an input from an operator (e.g., a requested speed) and attempts to run the container fill line 104 and equipment 110 at the specified speed.

In conventional container fill lines, it is the responsibility of the human operator to balance the three aforementioned factors in order to keep the Filler 108 operating at the highest speed possible. It can be appreciated that this balancing act is challenging and does not readily lead to achieving optimal throughput of containers (e.g., optimal, maximum or requested CPM). If the paint/coating output exceeds the input, for example, the Filler bowl 109 will be depleted and a fault (e.g., LOW LEVEL FAULT) will occur. If the Filler throughput is greater than the downstream equipment 110c can cope with, another fault (e.g., a container jam somewhere on the container fill line 104) is going to occur. On the other hand, if the Filler speed is set to a value low enough to prevent such faults, the container fill line 104 might be running at a lower-than-optimal speed.

Embodiments of the Expert System 120 address these and other challenges by replacing the human operator with an intelligent control system 115 that employs hierarchical rules 124 and machine learning models 128 to achieve optimal container fill line throughout. For some embodiments, the Expert System 120 can be considered a substitute for the human operator in the aforementioned balancing task.

The Expert System 120 is configured to acquire real-time data from plant equipment and continually sets the fill line speed (e.g., requested speed) according to current fill line, paint/coating, and pumping conditions. These and other conditions vary too fast for a human operator to be able to optimally control the container fill line 104. Moreover, because the Expert System 120 receives and/or generates data about the condition of the container fill line 104, the Expert System 120 can perform the additional task of sending information to the PLC 122 to help in fault detection (e.g., Fault Reason Detection) and to warn the operator about anomalous conditions that require immediate attention. The inventors found that when integrating the Expert System 120 and control system 115 into an existing paint container fill line, the container fill line was able to increase productivity (CPM) by up to about 20%.

According to the embodiment illustrated in FIG. 7, the Expert System 120 can be implemented as an Ignition application, which is available from Inductive Software. Ignition provides a programming environment, in the Jython language, and provides access to PLCs, databases, and web services. The Expert System 120 interfaces with the container fill line 104 and the filling process via the PLC 122. It is noted that the PLC 122 can also perform various auxiliary tasks, such as filtering, that need to exhibit low latency. The Expert System 120 uses various analytical services provided by the Sentinel Module 128a (e.g., via its RESTful interface—REST app). According to some embodiments, the Sentinel Module 128a is implemented as a web application that hosts machine learning models 128 and receives requests through its WebAPI. As will be discussed below, many of the machine learning models 128 include Anomaly Detection models that are fitted in order to inform the Expert System 120, which controls the Filler speed, whether the container fill line 104 is experiencing an anomalous behavior (e.g., of the Lid Placer 312, Labeler 314, Palletizer 316 and/or Wrapper 318).

In some implementations, the Expert System 120 can read various high-level data about a current order from a historical performance database 708. This information is used internally by the Expert System 120 and also sent to the PLC 122 to help in Fault Reason Detection. The Expert System 120 can also record events, anomalies, and generate statistics, which are stored in the container fill line system database 121. These data can be used for debugging or investigative purposes, for example. One of the statistics recorded by the Expert System 120 and stored in the fill line system database 121 is the MAXIMUM STABLE SPEED, which is preferably retrieved at the start of each order and used to set the initial speed of the Filler 108.

Example #1

According to an illustrative example, the Expert System 120 can run in a given environment with the following connections:
1. An Ignition 7.9 gateway with configured:
   a. Connection to the PLC 122
   b. Read-only connection to the historical performance database 708
   c. Connection to the Ignition Historian database
   d. Connection to the fill line system database 121
   e. Network access to the Sentinel Module's web services
2. The following modules can be utilized in this illustrative example:
   a. Allen-Bradley Driver (for the PLC 122)
   b. OPC-UA Besides having the Ignition project (.proj) and tags (.xml) files imported from the development environment, the following internal tags are to be properly set:
   a. CONFIG/DATABASEPROVIDER: the name of the connection to fill line system database 121
   b. CONFIG/HISTORIANPROVIDER: the name of the connection to historical performance database 708
   c. CONFIG/SENTINELURL: the complete URL to consume Sentinel Module services The Expert System 120 can be implemented to includes various components including state machines to control internal workflow, hierarchical rules that represent knowledge about how to control the process, and an interface layer to the process. According to some implementations of the Expert System 120, the interface layer can be rather thin and located mostly on the PLC 122.

State machines can be relatively simple and, as such, can be implemented directly in Jython instead of in a more sophisticated means such as SFC (Sequential Function Chart). In general, the relevant cycles that should be modeled as state machines are those corresponding to the processed orders. A typical cycle is depicted in the following example.

Example #2

States:
0. Initial state. Execution proceeds to state 1 if the container fill line 104 is running, Filler 108 is in AUTOMATIC mode and ACTUAL SPEED is stable. If the order is starting, REQUESTED SPEED is adjusted to the optimum value (e.g., based on previous similar orders).
1. Start analysis state. Commands to the PLC 122 to reset counters are sent. If an urgent correction of speed is in need, a speed up/speed down command is sent and the state machine proceeds to step 3; otherwise it proceeds to step 2 after ANALYSIS TIME expires. If running conditions are no longer valid (e.g., Filler 108 stopped or commuted to MANUAL MODE), the state machine returns to state 0 immediately.
2. Analysis state. The Expert System 120 analyses counters and takes a decision to speed up, speed down or doing nothing. In the latter case, state machine returns to state 0; otherwise the command to the PLC 122 is sent and the state machine proceeds to step 3. If running conditions are not valid anymore (e.g., Filler 108 stopped or commuted to MANUAL MODE), the state machine returns to state 0 immediately.
3. Deadtime state. The Expert System 120 waits the Deadtime Interval then return to state 0. If running conditions are no longer valid (e.g., Filler 108 stopped or commuted to MANUAL MODE), the state machine returns to state 0 immediately.

Turning now to the hierarchical rules 126 implemented by the Expert System 120, and according to some embodiments, there are two types (or sets) of rules in the Expert System 120: Basic rules 126a that control REQUESTED SPEED of the container fill line 104; and Advanced rules that control TOP SPEED of the container fill line 104.

By controlling REQUESTED SPEED, the Expert System 120 acts indirectly on the ACTUAL SPEED of the container fill line 104. In order to avoid changing Filler speed too fast, the REQUESTED SPEED is preferably increased or decreased in fixed steps of 1 CPM, at a minimum interval of 60 seconds, for example. This interval is intended to allow the flow valve located at the Filler inlet to have time to stabilize fill bowl level before a new change in speed is made.

By controlling TOP SPEED, the Expert System 120 acts even more indirectly on the ACTUAL SPEED. The desire is to have the advanced rules 126b and the basic rules 126a uncoupled as much as possible. TOP SPEED limits MAXIMUM SPEED, which is also limited by other factors (e.g., LIMIT SPEED, set by the plant supervisor, and MAXIMUM RUN RATE, set by the Filler 108 itself). All values are calculated dynamically and independently, which simplifies rule processing logic.

Each set of hierarchical rules 126 (basic rules 126a and advanced rules 126b) has rules to increase the target speed and others to decrease the target speed of the container fill line 104. It is important that the Expert System 120 achieve a balance between when to run the Filler 108 faster and the downstream equipment's capacity to process the filled containers. This balance can be achieved or optimized in part by tuning the parameters. In addition, each set of hierarchical rules 126 has a fixed priority in the set, expressed by its number. Higher priority rules have precedence over lower priority ones. In addition, the hierarchical rules 126 are processed at several steps of the processing cycle, with lower numbered cycles process first and more often than higher numbered cycles.

Example #3

In accordance with some embodiments, and for purposes of illustration, basic rules 126a can be numbered 1 to 6, and advanced rules 126b can be numbered 101 to 105. Basic rules are evaluated and act according to the current step of the main cycle of the order-wide state machine. The state machine steps are as follows:

a. Step 0: Idle
b. Step 1: Begin evaluation
c. Step 2: Conclude evaluation
d. Step 3: Dead time Step 0 lasts for 2 seconds and prepares the logic to begin evaluating how Filler current speed is fit to process conditions. For instance, if Filler speed is out of the working range, a command is sent to increase or decrease Filler speed to get nearer to that range. When every condition to evaluation is met, the state machine proceeds to step 1.

Step 1 lasts for 45 seconds. When the state machine comes to this step, a command is sent to the PLC 122 requiring a refresh in the process variables calculation. If any rule assigned to this step fires, the state machine proceeds to step 3, otherwise it proceeds to step 2.

Step 2 is a transition state when the rules assigned to it are evaluated; if any of them fires, the state machine proceeds to step 3, otherwise it proceeds to step 0. Step 3 is a waiting state that lasts for 60 seconds. The purpose of step 3 is to allow the flow valve to stabilize Filler bowl level before the next cycle takes place.

It can be appreciated that rules assigned to Step 1 do not wait 45 seconds for a confirmation of the current evaluation. These rules have their own time-to-confirm-style parameters (or fire immediately, in the absence of one). This feature is called short-circuit in the Expert System 120 context and allows faster-to-trigger rules to be implemented. It is noted that advanced rules 126a are not evaluated in any of these steps, but are evaluated periodically at fixed intervals.

Rules, both basic 126a and advanced 126b, take into account both process values, that vary dynamically, and also various constants, which are called PARAMETERS in this disclosure. Typically, each parameter affects one single rule. Parameters can be tuned to make the Expert System 120 perform more or less aggressively. Parameters are stored as internal tags and so Vision screens can be built to allow process engineers to change them.

Following discussion explains in detail the parameters related to each rule 126. Each rule 126 can be disabled or reenabled independently by changing the value of the corresponding enabling tag on Ignition. These are the STATS/RULENENABLED tags, where N is the number of the rule 126.

Rules 126 can be fired but prevented from actually changing REQUESTED SPEED when the Filler 108 is currently out of the allowed working range, delimited by MAXIMUM SPEED and MINIMUM SPEED parameters. The Expert System 120 records in the DigitalFillLine database (fill line system database) 121, for each order, how many times each rule 126 was fired, and how many times it acted. An analysis of those counters can give insight about how that order performed. For instance, an ideal result is having more lower priority than higher priority rules 126 fired.

Due to the considerable number of parameters and the fact that their tuning cannot be perfect for the broad range of characteristics of the material (e.g., a liquid, a semi-liquid material, a solid, a powder, an aerosolized material) handled by the container fill line 104, an automatic tuning mechanism can be employed. The automatic tuning mechanism can be configured to calculate a score for each rule 126 and changes its parameters slightly around their default values according to the calculated score. The automatic tuning mechanism (referred to as autotuning) can be implemented through specific rules (e.g., rules numbered 201 to 206), and each specific rule one can be disabled and reenabled by setting the corresponding tag (LEARNING/RULENENABLED).

Example #4—Basic Rules

Rule 1

The purpose of this rule is to decrease speed after a Low LEVEL FAULT occurs. The rationale is as follows: the fault indicates that the Filler 108 was running in too high a speed for the pumping system 110b to supply liquid material (e.g., paint, a coating) and the Expert System 120 could not decrease speed (by firing lower priority rules) as fast as necessary. This rule has no parameter related to be fired. It is limited by the MINIMUM SPEED allowed. It is evaluated at step 0 of the processing cycle. Ideally, Rule 1 should fire as least as possible since it depends on an undesired event to happen first.

Rule 2

The purpose of this rule is to decrease speed before a Low LEVEL FAULT occurs. The rationale is as follows: the Filler 108 was running too fast for the pumping system 110*b* to supply paint. This rule considers the following process values to fire:

LEVEL LOW: Filler bowl level is below the WARNING THRESHOLD

LEVEL DECREASING: Filler bowl level is consistently decreasing

PUMP ON: the pumping system is sending paint

VALVE TOO OPEN: the paint flow valve has been wide open for some time, i.e. the Filler 108 is receiving as much paint as possible NOT VALVE TOO CLOSE: the paint flow valve was not closed, i.e. the Filler 108 was receiving paint all the time Rule 2 has the following parameters related to be fired:

WARNING THRESHOLD: the level value to be considered as low (but not too low as to a fault be raised)

LEVEL DELAY: the minimum value of VALVE TOO OPEN time counter to be considered relevant CLOSE THRESHOLD: the minimum aperture of the valve to be considered as open OPEN THRESHOLD: the minimum aperture of the valve to be considered as wide open Rule 2 is limited by the MINIMUM SPEED allowed. Rule 2 is evaluated at step 1 of the processing cycle.

Rule 3

The purpose of this rule is to increase speed as soon as a LOW LEVEL FAULT can be avoided. It fires when liquid material (e.g., paint, a coating) has been requested by the Filler 108 in an intermittent fashion, what indicates the pumping system 110*b* can send more liquid material than the Filler 108 is currently using (the former is operating below its capacity). Rule 3 considers the following process values to fire:

PUMP CYCLING: the pumping system is being turned alternatively on and off by the Filler control system Rule 3 has no associated parameters. It is limited by the MAXIMUM SPEED allowed. Rule 3 is evaluated at step 2 of the processing cycle.

Rule 4

The purpose of this rule is to increase speed as soon as a LOW LEVEL FAULT can be avoided. It fires when the flow valve is working consistently while seldom open. This rule considers the following process values to fire:

VALVE TOO CLOSE: the flow valve was closed sometime

This rule has the following parameters related to be fired:

CLOSE THRESHOLD: the minimum aperture of the valve to it be considered as open

Rule 4 is limited by the MAXIMUM SPEED allowed. Rule 4 is evaluated at step 2 of the processing cycle.

Rule 5

The purpose of this rule is to decrease speed as soon as a lowering Filler bowl level is to be expected in the next minutes. It fires when the liquid material (e.g., paint, a coating) flow valve is working consistently wide open. This rule considers the following process values to fire:

VALVE TOO OPEN: the paint flow valve has been wide open for some time

This rule has the following parameters related to be fired:

OPEN THRESHOLD: the minimum aperture of the valve to it be considered as wide open Rule 5 is limited by the MINIMUM SPEED allowed. Rule 5 is evaluated at step 2 of the processing cycle.

Rule 6

The purpose of this rule is to increase speed as soon as a bowl level is stable and the pumping system 110*b* has additional capacity to supply liquid material (e.g., paint, a coating). Rule 6 fires when the flow valve is working consistently below the normal aperture range. This rule considers the following process values to fire:

NOT VALVE NORMAL: the paint flow valve has been open below the normal aperture range for some time This rule has the following parameters related to be fired:

OPEN THRESHOLD: the minimum aperture of the valve to it be considered as wide open CLOSE THRESHOLD: the minimum aperture of the valve to it be considered as open NORMAL THRESHOLD: the minimum aperture of the valve to it be considered as open in normal aperture range Rule 6 is limited by the MAXIMUM SPEED allowed. Rule 6 is evaluated at step 2 of the processing cycle.

Example #5—Advanced Rules

Rules 101 to 103

These rules were implemented and tested, but are not currently applicable to the particular container fill line 104 described herein. These rules are not considered deprecated since for other container fill lines, such tuning can be achieved.

Rule 104

The goal of this rule is to decrease TOP SPEED whenever downstream equipment 110*c* shows it cannot cope with the current Filler pace. This action prevents the basic rules 126*a* from increasing Filler speed even more while keeping their freedom to modulate it as necessary to keep bowl level at a convenient value.

Rule 104 depends on the Sentinel module's machine learning models 128 to detect performance anomalies. In some implementations, no single model 128 may be able to provide an indication of anomalous behavior that is fast and reliable enough. As such, Rule 104 combines all existing machine learning models 128 in a sort of sensor fusion. When two or more machine learning models 128 indicate anomalous behavior for some time, rule 104 is fired. This rule is evaluated periodically at a 2 second interval. Rule 104 is limited by MINIMUM TOP SPEED.

Rule 105

The goal of this rule is to increase TOP SPEED whenever downstream equipment 110*c* shows it can cope with the current Filler pace, this way balancing the effect of Rule 104. This rule fires when no anomaly is detected for some time. This rule is evaluated periodically at a 45 second interval. Rule 105 is limited by a combination of MAXIMUM RUN RATE and LIMIT SPEED.

Example #6—Notifications

The Expert System 120 gathers a significant amount of data from many pieces of equipment 110 to perform its various operations. As such, the Expert System 120 is capable of sending selected information to other systems to help them to perform their tasks. The Expert System 120 may be configured to make available the following:

1. To the plant operators, an alert about the most grievous obstacle that impacts performance. This is intended to give operators insight about what should be done to increase performance. This alert consists of a numeric code that is written to the DigitalFillLine database (fill line system database) 121 and intended to be shown on a screen of web app 706. The information can, of course, be read and used by other systems as well.

2. To the plant operators, an alert about The Expert System 120 reducing line pace to avoid jams at the inlet of the Labeler 314. This is important because, by doing so, the Expert System 120 allows operators to know that such a problem is occurring and the opportunity to fix any problems in the next changeover. This alert consists of a numeric code that is written to DigitalFill-Line database (fill line system database) 121 and intended to be shown on the screen of web app 706. The information can, of course, be read and used by other systems as well.

3. For debugging and analytical purposes, each relevant event is written to DigitalFillLine database (fill line system database) 121. Besides a numeric code that indicates the event type, it records the corresponding timestamp and the current RUNTIME COUNT, ORDER NUMBER, GOOD COUNTS and REQUESTED SPEED.
4. For debugging and analytical purposes, each relevant anomaly found is written to the DigitalFillLine database (fill line system database) 121. Besides a numeric code that indicates the anomaly type, the database 121 records the corresponding timestamp and the current RUNTIME COUNT, ORDER NUMBER, GOOD COUNTS and REQUESTED SPEED.

Many of the anomalies are used only internally by the Expert System 120.

Representative anomaly types are as follows:
1. Lid Placer low CPM: (Sentinel model 504) the Lid Placer 312 is not running fast enough to consume the containers sent by the Filler 108.
2. Labeler low CPM: (Sentinel model 508) the Labeler 314 is not running fast enough to consume the containers sent by the Lid Placer 312.
3. Many containers on Spiral Up: (Sentinel model for Spiral Up) there are more containers on the Spiral Up than the normal.
4. Lid Placer high CPM: the Lid Placer 312 appears to be running faster than the Labeler 314.
5. Lid Placer too slow: the Lid Placer 312 appears to be running slower than the Filler 108.

Combined anomalies: The container fill line 104 has been presenting some anomalous states (anomaly types 1, 2, 4 and 5) for some time.

Example #7—Performance Statistics

Relevant statistics are calculated by the Expert System 120 during the processing of each order and saved to the DigitalFillLine database (fill line system database) 121 for future use (e.g., for reporting). The following representative parameters are calculated by the Expert System 120:
1. MAXIMUM SUSTAINED SPEED: stored under parameter name MaxSpeed
2. THE EXPERT SYSTEM VERSION: stored under parameter name Version
3. PROGRAM ID: stored under parameter name ProgramID
4. SPEED PROFILE: stored under parameter names SpeedN
5. NUMBER OF TIMES FIRED: stored under parameter names RuleNFired
6. NUMBER OF TIMES ACTED: stored under parameter names RuleNActed
7. NUMBER OF ERRORS: stored under parameter names RuleNActed
8. Rule score
9. TANK NUMBER: stored under parameter names RuleNActed
10. PAILS (CONTAINERS) PRODUCED: stored under parameter names Pails (containers)
11. Duration
12. Downtime As previously discussed, the Expert System 120 interfaces with the PLC 122. Among other functions, the PLC 122 is configured to receive and process the speed commands for the Filler 108, check the status of the system communication, and perform various process variable calculations and time integrations that require higher processing speed not available on the Expert System host machine.

As also discussed previously, the Expert System 120 interfaces with the Filler 108. The Expert System 120/Filler 108 interface is configured to bridge the commands and parameters from the Expert System 120 to the Filler controller, as well as to feed the system with the process variables received from the Filler 108. Typical commands issued by the Expert System 120 are discrete signals to increase or decrease the current speed of Filler 108 (and other equipment 110). The commands are erased at the end of the routine, thus being valid only for one PLC scan. The PLC 122 generates a pulse on an off-delay timer with a programmable duration, which is sent to the Filler 108. The Filler 108 should be in production mode and set to remote speed control. To allow speed increase commands, the speed command needs to be both less than the maximum limit configured on Expert System parameters and the pre-established safe speed threshold. The latter is calculated in the routine by the subtraction of two CPM from the current maximum run rate. To allow the speed decrease commands, the speed command should be higher than the minimum limit configured on Expert System parameters and higher than the absolute low limit of 6 CPM, for example.

A bowl level average calculation is used to filter and smooth the level signal used by the Expert System 120. The calculation is based on the exponential moving average formula:

$$\text{Average} = (\text{present reading} * k) + ((1-k) * \text{Average})$$

Where:

$$k = (2/n+1)$$

$n$ = Window Size—Expert System parameter.

A bowl level deviation rate routine implemented by the Expert System 120 and PLC 122 calculates the rate of the bowl level deviation based on the elapsed time from the periodic CPU task cycle. It is available on a Level Control tag in units of percent per second. The bowl level deviation rate is also used to detect positive and negative trends sent to the Expert System 120 as a discrete Boolean value.

Some of the container fill line conditions used by the Expert System decision-making process are treated on the PLC logic before it can be valuable. An example is a period in which the Filler bowl level control valve stays in the fully open position, meaning that the liquid material (e.g., paint, a coating) flow is insufficient to supply the filling demand at a certain Filler speed, thus requiring corrections. The PLC 122 may be the more suitable environment to perform the time integration task due to the speed of processing.

A heartbeat counter is continually updated on the Expert System 120 and written on Level Control Heartbeat tag on the PLC 122 to verify if it is running and accessible. If the counting freezes, the watchdog timer initiates, and after timeout (e.g., 2 minutes), the Filler speed control is switched to manual/local mode via a specified interface tag. This condition is preferably notified on a Filler dashboard screen. The return of the Filler 108 to remote mode is preferably not made automatically on the PLC logic. It must be done manually by the operation staff. The watchdog logic is bypassed for 2 minutes after the restart of the PLC CPU to avoid switching to local mode before Expert System reconnection.

As will be discussed in detail hereinbelow, machine learning models 128 of the Sentinel Module 128a are used by the Expert System 120 to identify any kind of anomalous behavior by the container fill line equipment 110, such as the downstream equipment 110c. The anomalies detected are related to performance in some way. The Sentinel module 128a can be implemented as a stateless service, so the Expert System 120 needs to acquire real-time process data and submit it to receive a response. These process data are acquired from the PLC 122. In addition, the Sentinel module 128a is responsible for the calculation of the batch's MAXIMUM STABLE SPEED. In some embodiments, data to be passed to the Sentinel Module 128a is read from Ignition Historian.

As previously discussed, the Expert System 120 can be implemented to use the DigitalFillLine database (fill line system database) 121 to indirectly send notifications to a web app 706 (see FIG. 7), thereby minimizing the coupling of the Expert System 120 and the DigitalFillLine database (fill line system database) 121. The DigitalFillLine database (fill line system database) 121 also stores statistical data intended mostly to future use (e.g., the statistical value MAXIMUM STABLE SPEED).

According to some embodiments, when an order starts, the Expert System 120 retrieves the values corresponding to all orders with the same tank size and formula or product, and uses the highest value as a reference for the starting speed. When the result is zero, this means such a Master rex was never processed using such a tank, and the starting speed defaults to MINIMUM TOP SPEED. When result is higher than zero, but lower than MINIMUM SPEED, this is the value used by the Expert System 120 to start the batch.

In some implementations, a screen in the supervisory system of the control system 115 can be provided to allow the values of some parameters to be altered by the plant supervisor or the process engineer. Many of the parameters available at this screen can be used for tuning the Expert System 120 (e.g., values for the speed limits and the switch to turn the Filler 108 to manual mode).

Figure 8:
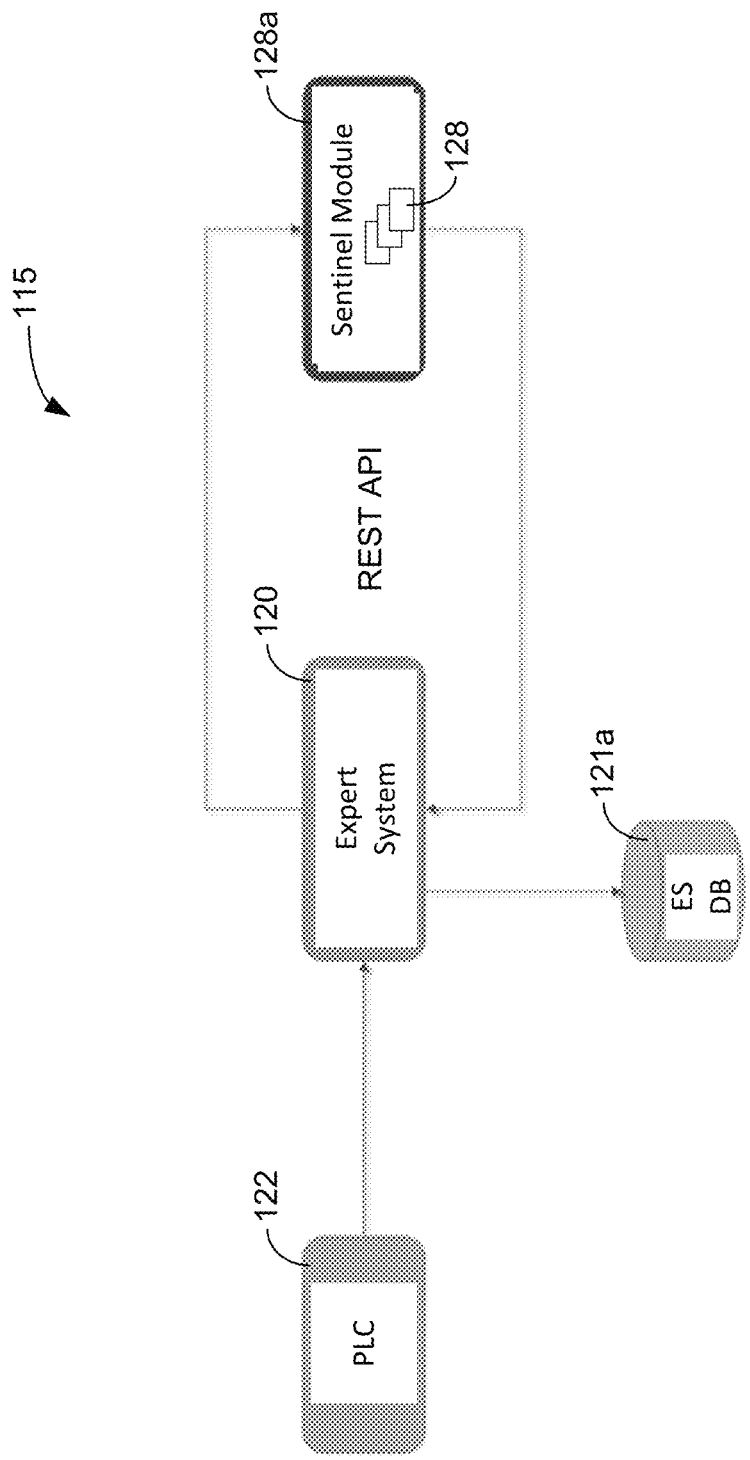
FIG. 8 is a block diagram of a control system in accordance with various embodiments.

FIG. 8 is a block diagram of a control system 115 in accordance with various embodiments. The control system 115 includes the Expert System 120 operatively coupled to the PLC 122, the Sentinel Module 128a, and a database 121a. The database 121a may be the DigitalFillLine database (fill line system database) 121 or a different databases 121 accessible (e.g., dedicated) to the Expert System 120. The Sentinel Module 128a shown in FIG. 8 is implemented as a web application that hosts the machine learning models 128, such as the models 502-514 shown in FIG. 5.

In accordance with various embodiments, at least some of the machine learning models 128 are implemented as Anomaly Detection models which are fitted to operation data for each type of equipment 110 of the container fill line 104. Some of the Anomaly Detection models 128 are fitted in order to inform the Expert System 120, which controls the Filler speed, whether the container fill line 104 is experiencing anomalous behavior (e.g., anomalous behavior of the Denester 310, Filler 108, Lid Placer 312, Labeler 314, Palletizer 316, and/or Wrapper 318). The machine learning models 128 also include models other than anomalous behavior models, such as a Maximum Stable Speed Model 514.

According to some embodiments, the Sentinel Module 128 is implemented as an application that receives requests through its WebAPI. In the embodiment shown in FIG. 8, the Sentinel Module 128 communicates only with the Expert System 120. In a representative deployment, the Sentinel Module 128 can be implemented using a Windows 10 64 bits, Linux (Debian or RPM distributions) 64 bits operating system, having an Intel Core i5 or higher processor, 8 GBs of RAM, and a 40 GB hard drive. In some embodiments, the Sentinel Module 128 can be developed using Python language (e.g., version 3.7.3). Visual Studio Code can be used as the integrated development environment (IDE) to develop and maintain the Sentinel Module application.

With continued reference to FIGS. 8, 7, 5 and 3, the machine learning models 128 hosted by the Sentinel Module 128 can be trained using data stored in the historical performance database 708 using various techniques including known techniques. The data used to train each of the machine learning models 128 comprises past performance data associated with each type of equipment 110 acquired within a user-specified date range. In the representative embodiment shown in FIG. 5, past performance data associated with the Denester 310 can be used to train the Denester model 502. Past performance data associated with the Filler 108 can be used to train the Filler model 512. Past performance data associated with the Lid Placer 312 can be used to train the Lid Placer model 504. Past performance data associated with the Labeler 314 can be used to train the Labeler model 508. Past performance data associated with the Palletizer 316 can be used to train the Palletizer model 506. Past performance data associated with the Wrapper 318 can be used to train the Wrapper model 510. Past performance data (e.g., data from the prior order) associated with the container fill line 104 (e.g., some or all of the container fill line equipment 110) can be used to train the Maximum Stable Speed model 514.

Suitable model-based machine learning techniques include those that can be implemented using a model specification language, in which the model can be defined using compact code, and from which the software implementing that model can be generated (e.g., automatically). Various known model-based machine learning techniques can be used to create a broad range of machine learning models 128, along with suitable inference or learning algorithms, for a broad range of container fill line equipment 110. It is to be understood that any machine learning platform can be used which is capable of implementing the processes and algorithms disclosed herein.

Each specific machine learning model 128 can be tuned to the individual requirements of the particular piece of equipment 110. For example, if the application requires a combination of clustering and classification in the context of time-series data, it may not be necessary to combine traditional algorithms for each of these elements (Gaussian mixtures, neural networks and hidden Markov models (HMMs), for instance), but instead a single, integrated model capturing the desired behavior can be constructed. If changes are made to a particular machine learning model 128, the corresponding modified inference software can be created automatically. In some implementations, the machine learning models 128 can be described by compact code within a generic modelling language, such that the structure of the model 128 is readily apparent.

In some implementations, it may not be beneficial to retrieve a large amount of historical performance data at once from the historical performance database 708. To address this issue, the aforementioned Ignition App (CBM-Queries) provides for the extraction of tag data on daily ranges and saves them in multiple CSV files which can be merged using appropriate Python code. Two utility functions of the Ignition App are of particular interest: (1) the CBM-Queries utility function saves multiple files and concatenates all the files with the same prefix (same process variable files but different date ranges) before data models (re)training; and (2) a merge utility function that merges each concatenated file in a master dataset, which is a large CSV file which is used to (re)train the models and to carry out exploratory analysis.

Figure 9:
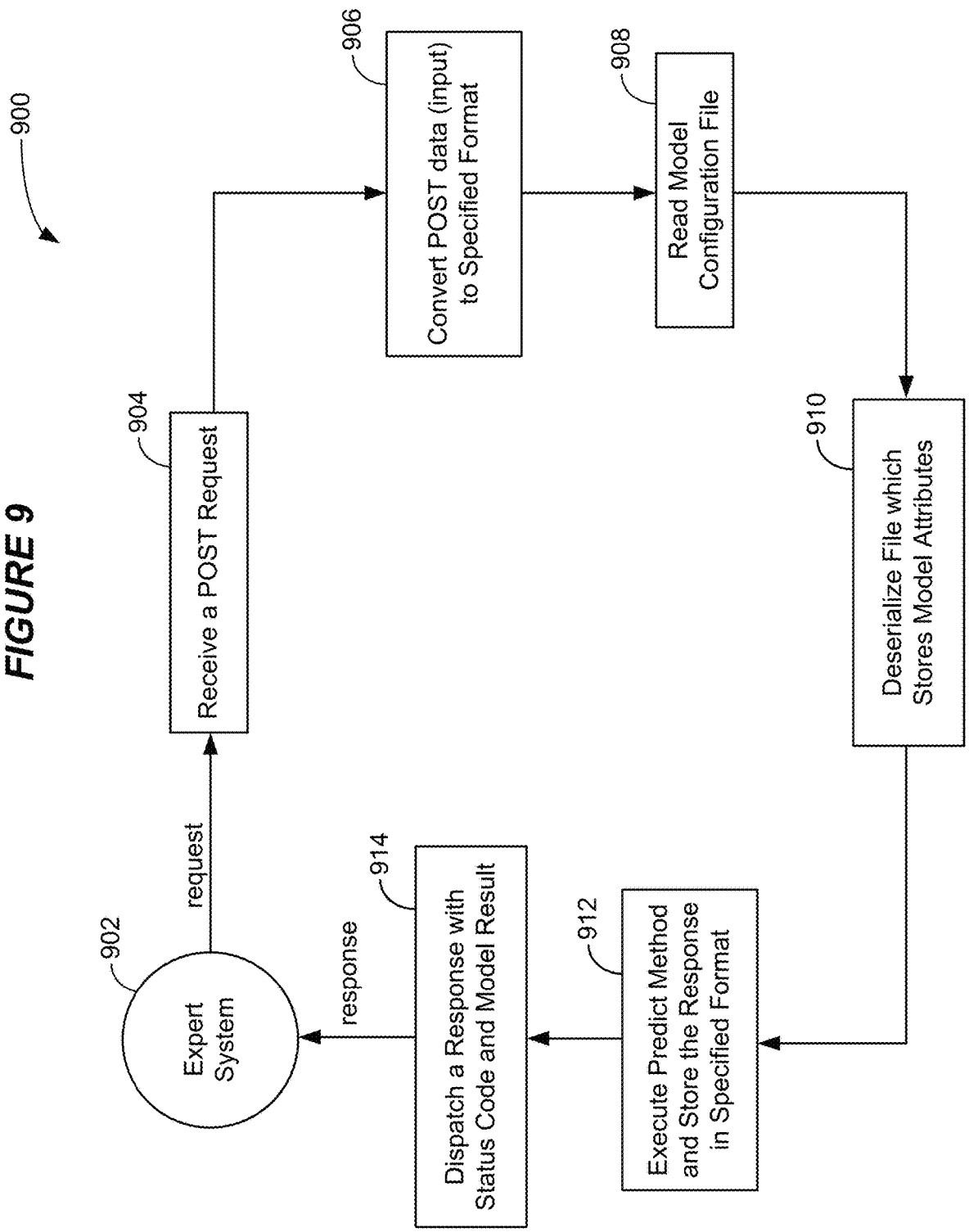
FIG. 9 illustrates general processes involving representative machine learning models in response to an Expert System request in accordance with various embodiments.

In accordance with various embodiments, the machine learning models 128 perform the general steps 900 depicted in FIG. 9 in response to an Expert System request 902. These steps include receiving 904 a POST request by a processing app, converting 906 POST data to a specified format, reading 908 a model configuration file, deserializing 910 a file which stores model attributes, executing 912 a prediction method and storing the response in a specified format, and dispatching 914 the response with status code and model result to the Expert System 902.

As previously discussed, according to some implementations, the machine learning models 128 are built as low performance models (also called Anomaly Detection models) and are fitted to inform the Expert System 120, which controls the Filler speed, whether the container fill line 104 is experiencing an anomalous behaviour on any of the pieces of equipment 110 (e.g., the Denester 310, Filler 108, Lid Placer 312, Labeler 314, Palletizer 316 and/or Wrapper 318).

Example #8—Lid Placer Machine Learning Model—Low Performance

Figure 10:
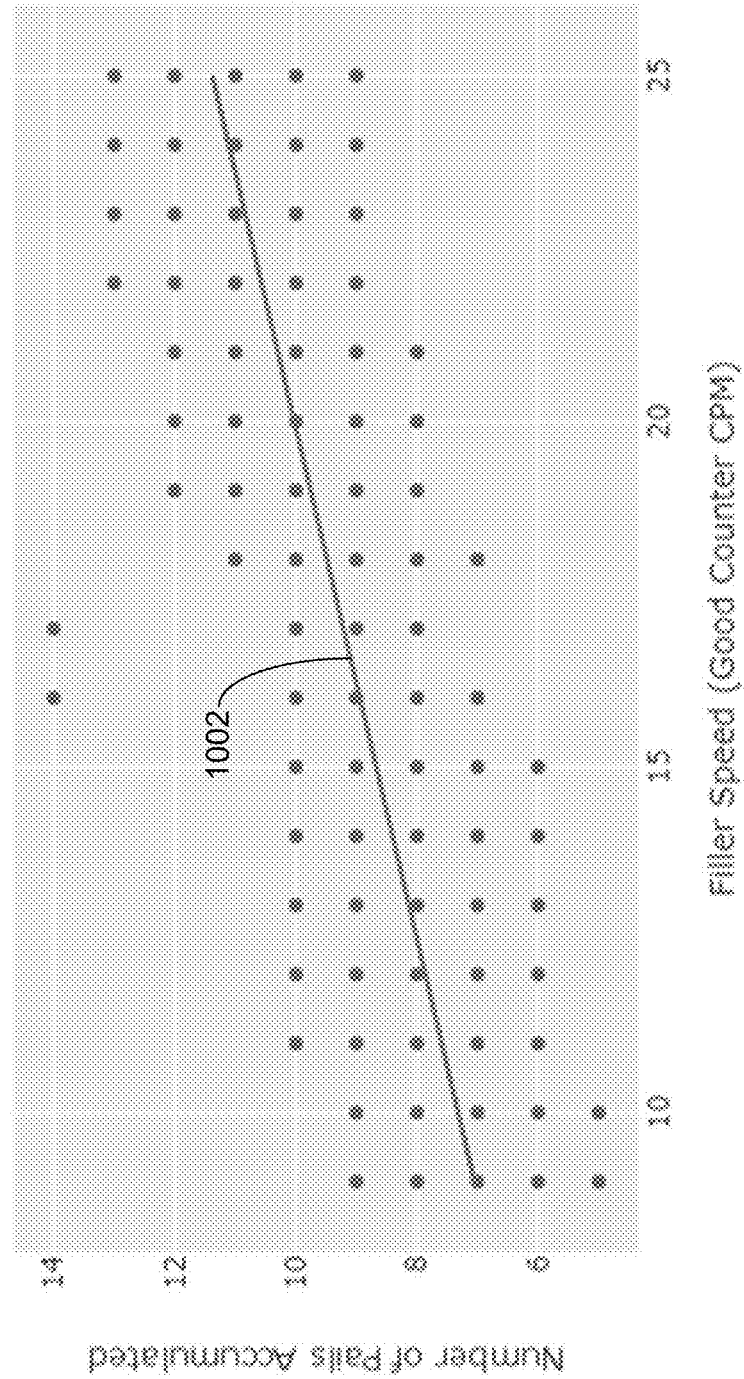
FIG. 10 illustrates a plot of the number of containers (e.g., pails) accumulated in a first segment of a container fill line as a function of Filler speed (CPM) in accordance with various embodiments.

For a given Filler speed (e.g., calculated by the rate of change of a good counter tag), it is expected that a certain number of containers will accumulate in the segment between the output of the Filler 108 and the output of the Lid Placer 312. In general, the higher the Filler speed the greater the number of containers that can be accumulated in this segment. FIG. 10 illustrates a plot of the number of containers (e.g., 5 gallon pails) accumulated in this segment as a function of Filler speed (good counter CPM). Historical performance data for the Lid Placer 312 over a specified date range is obtained from the historical performance database 708. Training the Lid Placer model 504 involves filtering out outlier data and preparing a subset of the remaining data to train the Lid Placer model 504. Afterwards, a linear regression is fitted, which is represented by line 1002 in FIG. 10. The linear regression obtained is represented by the following equation:

$$\text{NumberOfPailsAccumulated} = 0.275 \cdot \text{FillerSpeed} + 4.716 \quad (1)$$

To reduce the number of false positive anomalies, a parameter called threshold (e.g., in terms of number of containers) is used so that whenever the current number of containers accumulated is greater than the value obtained by the Equation 1 above plus the configured threshold, an anomaly flag is raised. The threshold parameter can be adjusted (e.g., in runtime) in the model configuration file as needed or desired. It is noted that a Lid Placer Low Performance Flag can be represented as the Rule:

$$\text{CurrentNumberOfPailsAccumulated} > 0.275 \cdot \text{FillerSpeed} + 4.716 + \text{threshold} \quad (2)$$

Additionally, if the current number of containers accumulated is greater than the configured parameter (e.g., maxCurrentNumberOfPails), the Lid Placer model 504 returns False due to bad quality of inputs.

Figure 11:
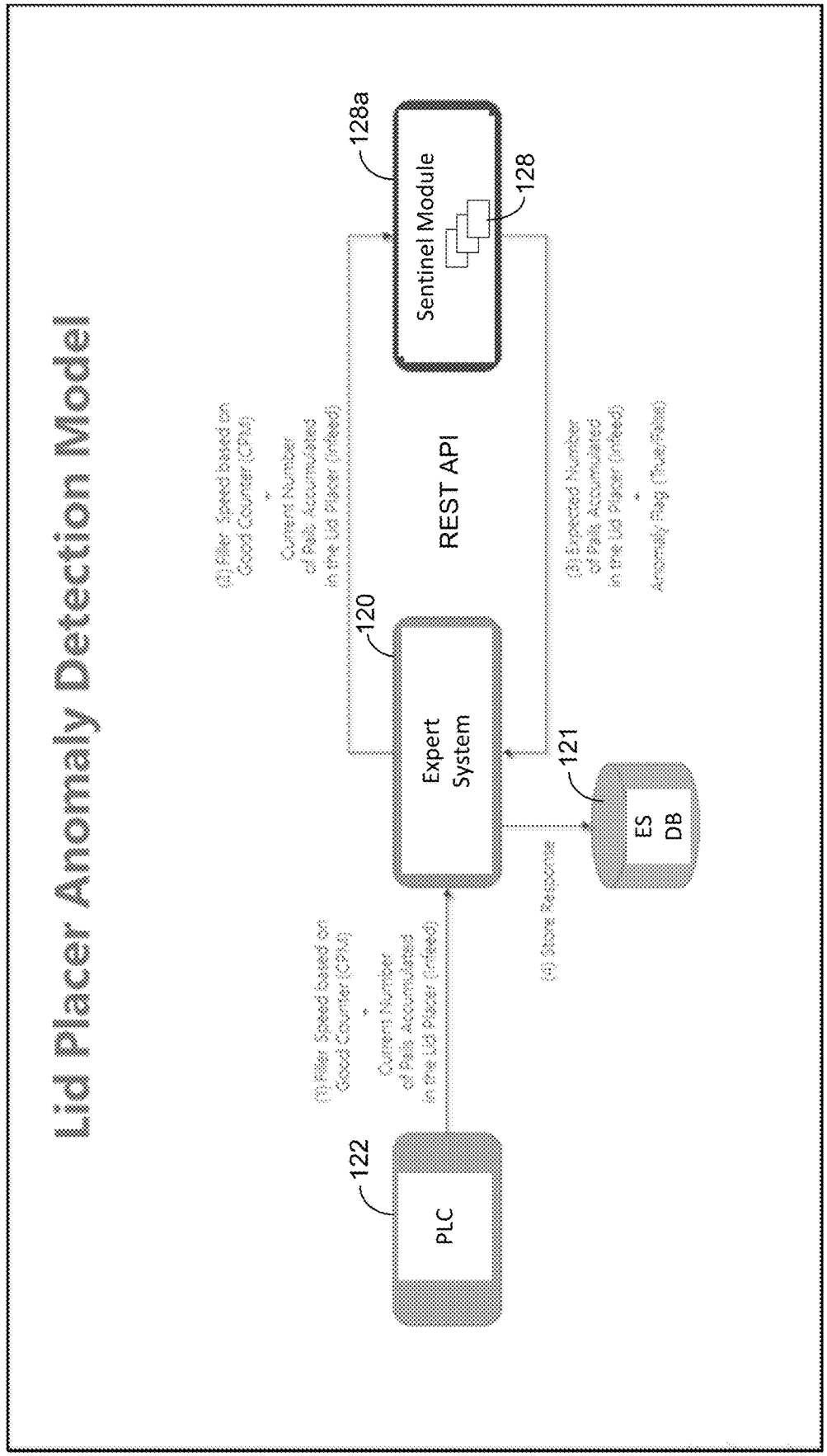
FIG. 11 illustrates a Lid Placer Anomaly Detection Model in accordance with various embodiments.

FIG. 11 illustrates a Lid Placer Anomaly Detection Model in accordance with various embodiments. More particularly, FIG. 11 illustrates the execution of the Lid Placer model 504 which includes the four steps (1)-(4) highlighted in FIG. 11. In the following example, the Expert System 120 reads the Filler Speed (based on the good counter changes) and, from the PLC 122, reads the current number of containers accumulated in the segment between the output of the Filler 108 and the output of the Lid Placer 312. The Expert System then makes a POST request (see, e.g., step 904 in FIG. 9) and adds the inputs from the Lid Placer model 504 in the appropriate format (e.g., JSON format). The API returns a response, also in the appropriate format (e.g., JSON format), to the Expert System 120 (see, e.g., step 914 in FIG. 9).

The first step (1) shown in FIG. 11 involves the PLC 122 computing the sum of the Filler speed based on the good counter (CPM) and the current number of containers accumulated in the Lid Placer 312 (infeed). This sum is sent from the PLC 122 to the Expert System 120. Step (2) involves the Expert System 120 sending the sum received from the PLC 122 to the Sentinel module 128a for use with the Lid Placer model 504. In step (3), the Sentinel module 128a uses the Lid Placer model 5042 compute the expected number of containers accumulated in the Lid Placer 312 (infeed) plus an anomaly flag, which is set to true or false by the Sentinel module 128a. The Expert System 120 uses the anomaly flag ("value" attribute of the response) to make decisions regarding the speed control and stores the result in a relational database 121 at step (4).

Example #9—Labeler Machine Learning Model—Low Performance

For a given Lid Placer speed (calculated by the rate of change of the totalizer tag), it is expected that a certain number of containers will accumulate in the segment between the output of the Lid Placer 312 and the input of the Labeler 314. In general, the higher the Lid Placer speed the greater the number of containers that can be accumulated in this segment.

Figure 12:
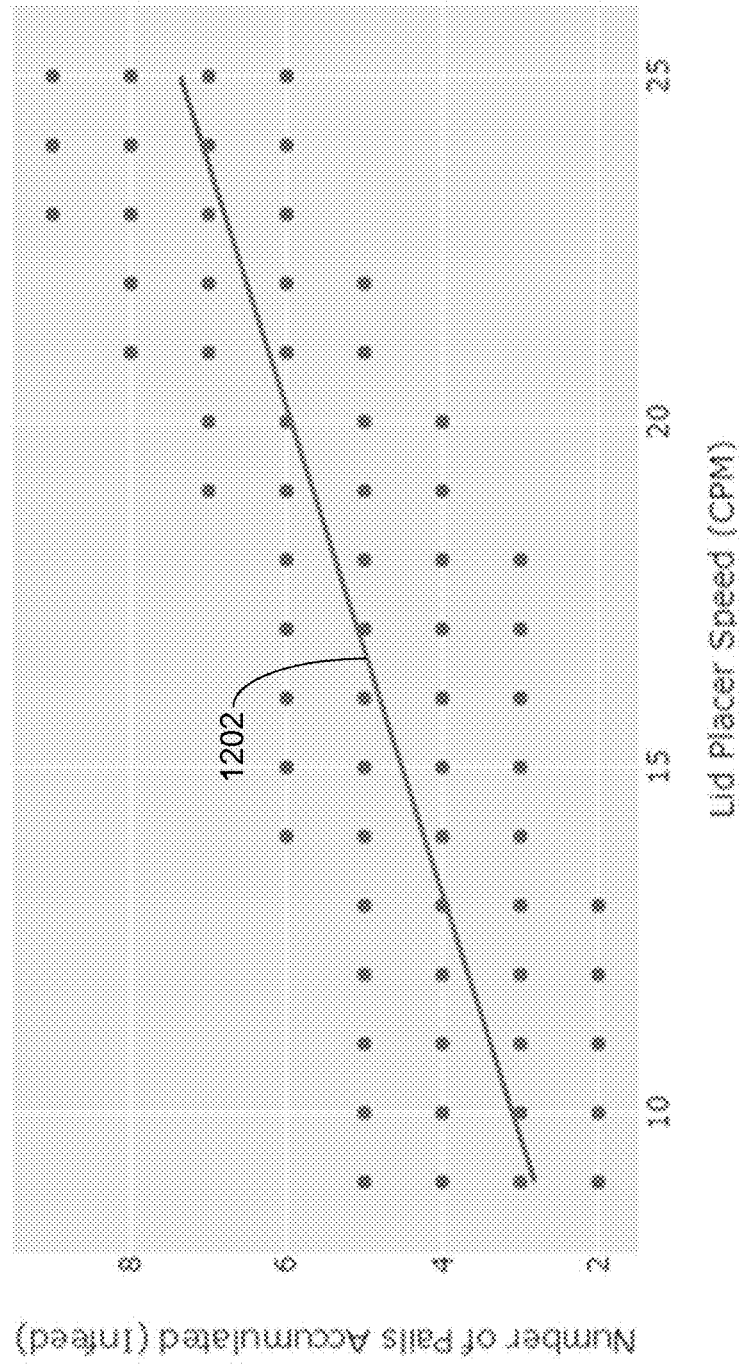
FIG. 12 illustrates a plot of the number of containers (e.g., pails) accumulated in a second segment of a container fill line as a function of Lid Placer speed (CPM) in accordance with various embodiments.

FIG. 12 illustrates a plot of the number of containers (e.g., 5 gallon pails) accumulated in this segment as a function of Lid Placer speed (CPM). Historical performance data for the Labeler 314 over a specified date range is obtained from the historical performance database 708. Training the Labeler model 508 involves filtering out outlier data and preparing a subset of the remaining data to train the Labeler model 508. Afterwards, a linear regression is fitted, which is represented by line 1202 in FIG. 12. The linear regression obtained is represented by the following equation:

$$\text{NumberOfPailsAccumulated} = 0.335 \cdot \text{LidPlacerSpeed} - 0.649 \quad (3)$$

To reduce the number of false positive anomalies, a parameter called threshold is used so that whenever the current number of containers accumulated is greater than the value obtained by the Equation 3 above plus the configured threshold, an anomaly flag is raised. The threshold parameter can be adjusted (e.g., in runtime) in the model configuration file as needed or desired. It is noted that a Labeler Low Performance Flag can be represented as the Rule:

$$\text{CurrentNumberOfPailsAccumulated} > 0.335 \cdot \text{LidPlacerSpeed} - 0.649 + \text{threshold} \quad (4)$$

Additionally, if the current number of containers accumulated is greater than the configured parameter (e.g., maxCurrentNumberOfPails), the Lid Placer model 504 returns False due to bad quality of inputs.

Figure 13:
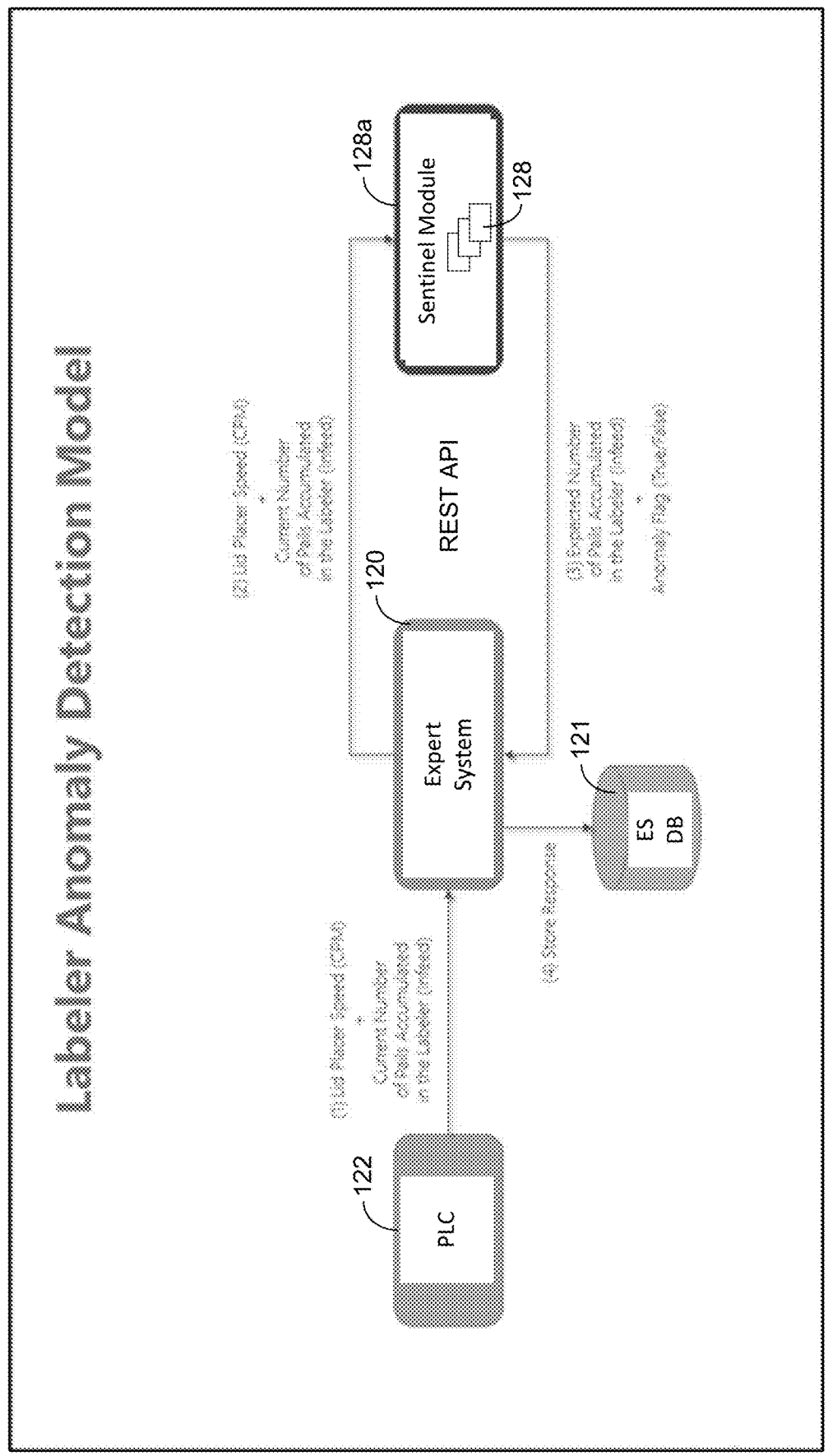
FIG. 13 illustrates a Labeler Anomaly Detection Model in accordance with various embodiments.

FIG. 13 illustrates a Labeler Anomaly Detection Model in accordance with various embodiments. More particularly, FIG. 13 illustrates the execution of the Labeler model 508 which includes the four steps (1)-(4) highlighted in FIG. 13. In the following example, the Expert System 120 reads the Labeler Speed and, from the PLC 122, reads the current number of containers accumulated in the segment between the output of the Lid Placer 312 and the input of the Labeler 314. The Expert System then makes a POST request (see, e.g., step 904 in FIG. 9) and adds the inputs from the Labeler model 508 in the appropriate format (e.g., JSON format). The API returns a response, also in the appropriate format (e.g., JSON format), to the Expert System 120 (see, e.g., step 914 in FIG. 9).

The first step (1) shown in FIG. 13 involves the PLC 122 computing the sum of the Lid Placer speed and the current number of containers accumulated in the Labeler 312 (infeed). This sum is sent from the PLC 122 to the Expert System 120. Step (2) involves the Expert System 120 sending the sum received from the PLC 122 to the Sentinel module 128a for use with the Labeler model 508. In step (3), the Sentinel module 128a uses the Labeler model 508 to compute the expected number of containers accumulated in the Labeler 314 (infeed) plus an anomaly flag, which is set to true or false by the Sentinel module 128a. The Expert System 120 uses the anomaly flag ("value" attribute of the response) to make decisions regarding the speed control and stores the result in a relational database 121 at step (4).

Example #10—Palletizer Machine Learning Model—Low Performance

For a given Spiral Down speed (calculated by the rate of change of a photo-eye tag), it is expected that a certain number of containers will accumulate in the segment between the Spiral Down output and the input of the Palletizer 316. In general, the higher the Spiral Down speed the greater the number of containers that can be accumulated in this segment.

Figure 14:
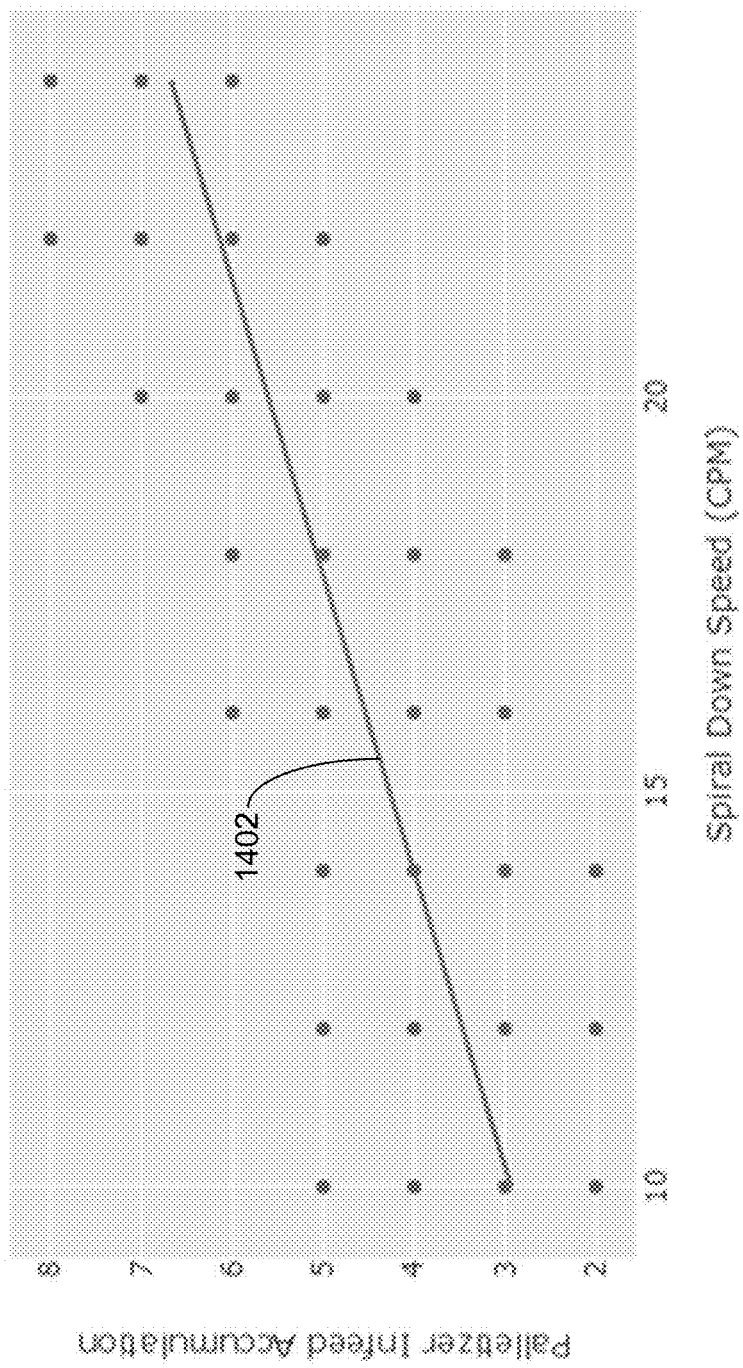
FIG. 14 illustrates a plot of the number of containers (e.g., pails) accumulated in a third segment of a container fill line as a function of Spiral Down speed (CPM) in accordance with various embodiments.

FIG. 14 illustrates a plot of the number of containers (e.g., 5 gallon pails) accumulated in this segment as a function of Spiral Down speed (CPM). Historical performance data for the Palletizer 316 over a specified date range is obtained from the historical performance database 708. Training the Palletizer model 506 involves filtering out outlier data and preparing a subset of the remaining data to train the Palletizer model 506. Afterwards, a linear regression is fitted, which is represented by line 1402 in FIG. 14. The linear regression obtained is represented by the following equation:

$$\text{NumberOfPailsAccumulated} = 0.267 \cdot \text{SpiralDownSpeed} + 0.256 \quad (5)$$

To reduce the number of false positive anomalies, a parameter called threshold is used so that whenever the current number of containers accumulated is greater than the value obtained by the Equation 5 above plus the configured threshold, an anomaly flag is raised. The threshold parameter can be adjusted (e.g., in runtime) in the model configuration file as needed or desired. It is noted that a Palletizer Low Performance Flag can be represented as the Rule:

$$\text{CurrentNumberOfPailsAccumulated} > 0.267 \cdot \text{SpiralDownSpeed} + 0.256 + \text{threshold} \quad (6)$$

Additionally, if the current number of containers accumulated is greater than the configured parameter (e.g., maxCurrentNumberOfPails), the Palletizer model 506 returns False due to bad quality of inputs.

Figure 15:
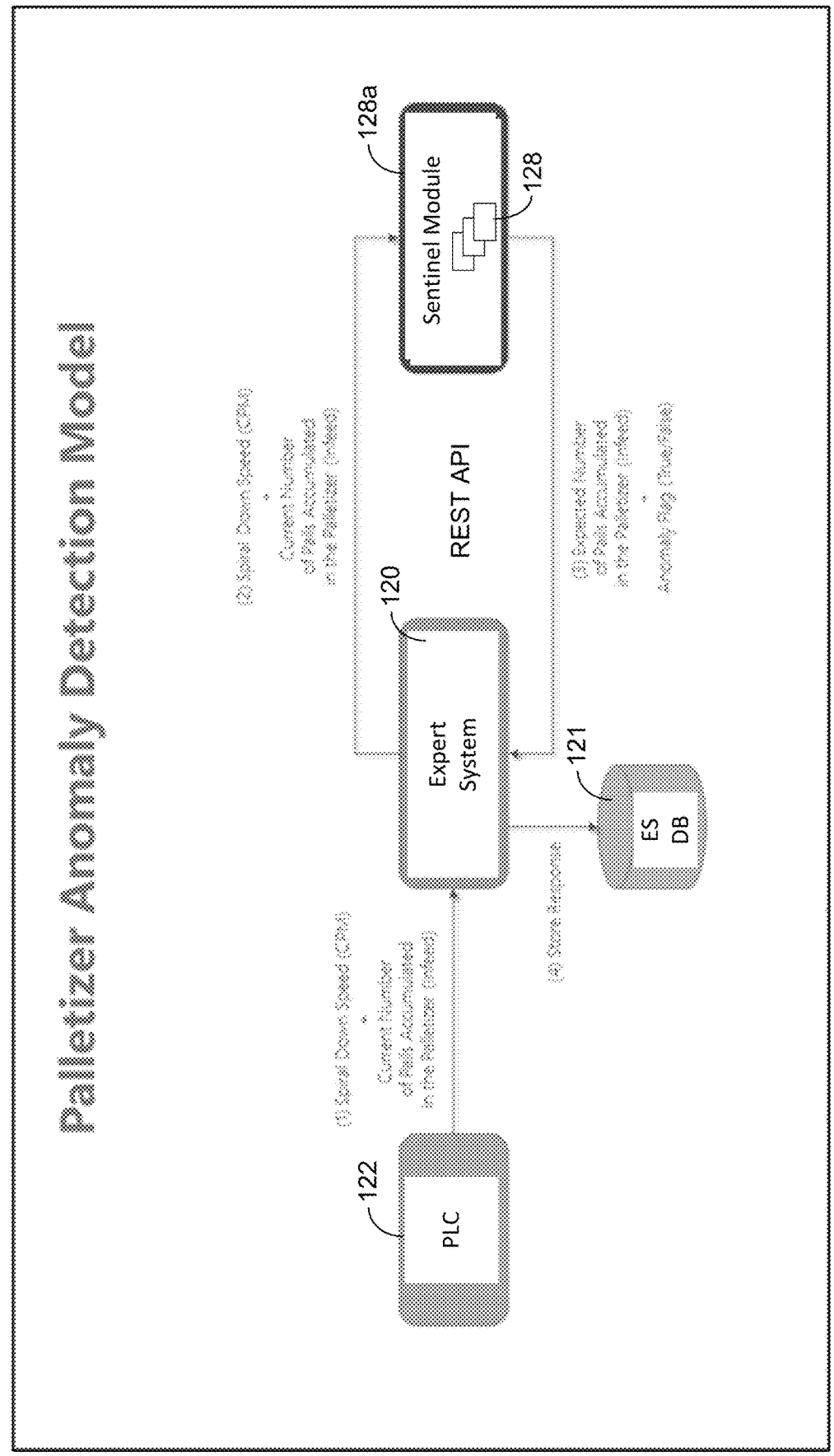
FIG. 15 illustrates a Palletizer Anomaly Detection Model in accordance with various embodiments.

FIG. 15 illustrates a Palletizer Anomaly Detection Model in accordance with various embodiments. More particularly, FIG. 15 illustrates the execution of the Palletizer model 506 which includes the four steps (1)-(4) highlighted in FIG. 15. In the following example, the Expert System 120 reads the Spiral Down Speed and, from the PLC 122, reads the current number of containers accumulated in the segment between the Spiral Down output and the input of the Palletizer 316. The Expert System then makes a POST request (see, e.g., step 904 in FIG. 9) and adds the inputs from the Palletizer model 506 in the appropriate format (e.g., JSON format). The API returns a response, also in the appropriate format (e.g., JSON format), to the Expert System 120 (see, e.g., step 914 in FIG. 9).

The first step (1) shown in FIG. 15 involves the PLC 122 computing the sum of the Spiral Down speed and the current number of containers accumulated in the Palletizer 316 (infeed). This sum is sent from the PLC 122 to the Expert System 120. Step (2) involves the Expert System 120 sending the sum received from the PLC 122 to the Sentinel module 128a for use with the Palletizer model 506. In step (3), the Sentinel module 128a uses the Palletizer model 506 to compute the expected number of containers accumulated in the Palletizer 314 (infeed) plus an anomaly flag, which is set to true or false by the Sentinel module 128a. The Expert System 120 uses the anomaly flag ("value" attribute of the response) to make decisions regarding the speed control and stores the result in a relational database 121 at step (4).

Example #11—Maximum Stable Speed Analysis

The Maximum Stable Speed model 514 can be implemented as a model 128 in the Sentinel Module 128a to analyze the Maximum Stable Speed of the container fill line 104. The Maximum Stable Speed model 514 is configured to calculate the Maximum Stable Speed of the current order so that the next time the same or equivalent order is implemented by the container fill line 104, the Filler 108 is programmed to start with that speed, previously stored. The container filling process implemented by the Filler 108 is said to be stable when it meets the following conditions:

The evaluated Filler speed matches the requested speed $$\text{speed\_actual} \geq \text{speed\_requested} - 1 \quad (7)$$

The Filler speed has not been changed within the evaluated time range.

The number of filled containers is greater than 0.

$$\text{good\_counter} > 0 \quad (8)$$

The duration of the time range is greater than a minimum configured parameter.

$$\text{duration} \geq \text{minimum\_configured\_duration} \quad (9)$$

Finally, the maximum stable speed is the highest speed given all the time ranges (extracted from the order historical data) that meets the above conditions.

It is noted that the Maximum Stable Speed model parameters can be adjusted in runtime.

Figure 16:
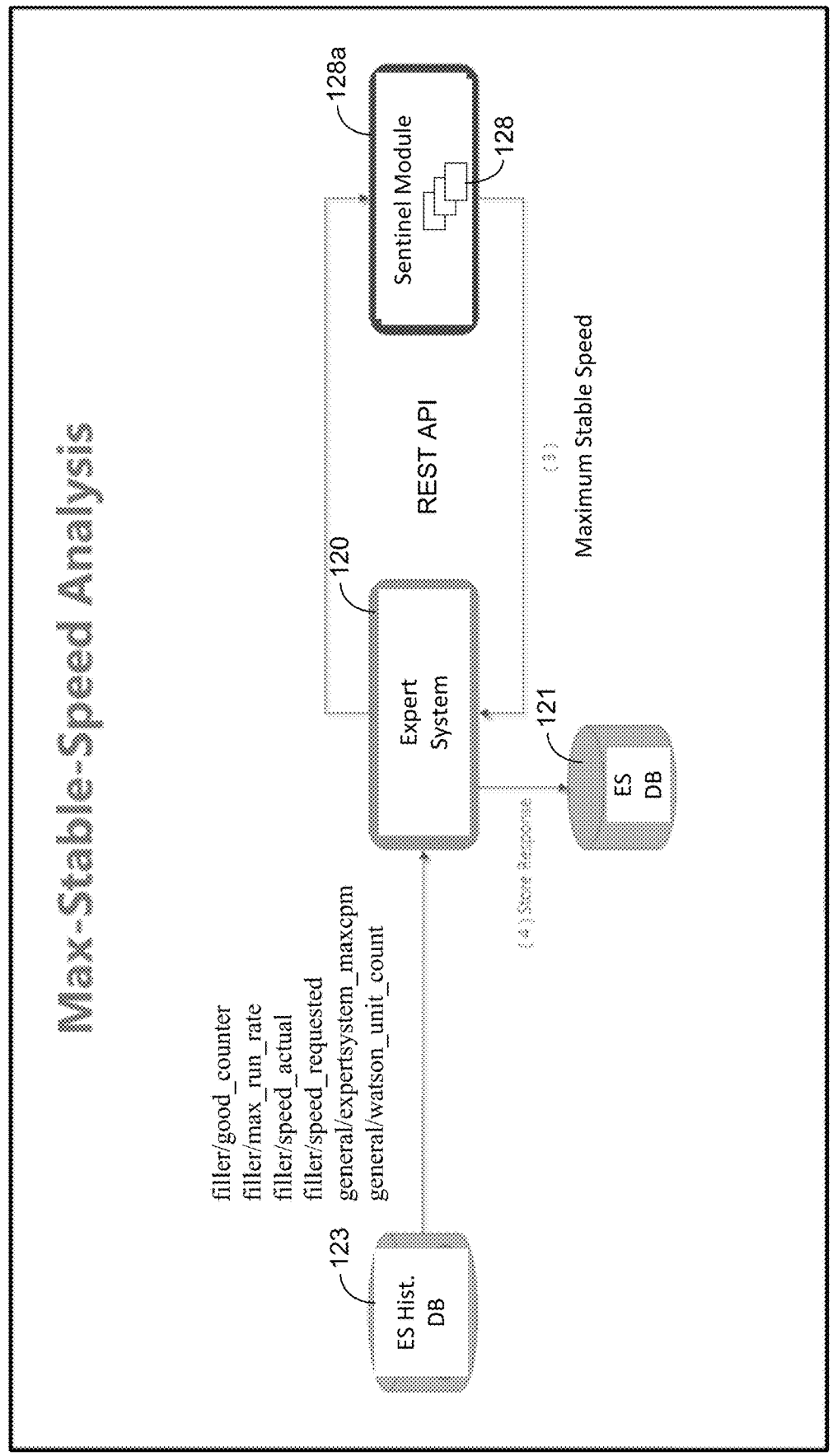
FIG. 16 illustrates the execution of the Maximum Stable Speed model in accordance with various embodiments.

The execution of the Maximum Stable Speed model 514 follows the steps illustrated in FIG. 16. The first step (1) shown in FIG. 16 involves the Expert System 120 obtaining the following data from an Expert System historical database 123: Filler/good_counter, Filler maximum run rate, Filler actual speed, Filler requested speed, Expert System maximum CPM, and order unit count. The Expert System 120 sends these data to the Sentinel Module 128a and, more particularly, to the Maximum Stable Speed model 514. The Maximum Stable Speed model 514 computes the Maximum Stable Speed of the container fill line 104 using the methodology discussed above (see condition 5).

In general, and with respect to any of the machine learning models 128, the Sentinel Module 128a can be configured to facilitate retraining of the machine learning models 128. Generally, retraining of the machine learning model 128 results in creating a new version of the model 120 rather than replacing the current version.

Example #12—Filler Bowl Level Evaluation in Runtime

In this illustrative example, it is assumed that the Filler 108 is filling at 23 CPM per an instruction issued by the Expert System 120. A process aberration occurs and the flow begins to drop. The bowl level stays static around 340-350 millimeters but the proportional valve begins to open to around 90% open. Once the system reaches 90% open, the Expert System 120 evaluates the Filler bowl level. If there is a negative trend in bowl level, the Filler 108 will reduce CPM until the trend is positive or neutral. After one CPM reduction, the system will wait to stabilize and the Expert System 120 will check these variables again.

Example #13—Maximum Stable Speed Analysis

In this illustrative example, it is assumed that the Filler 108 is filling at 18 CPM per the instruction issued by the Expert System 120. A process aberration is removed and the flow begins to increase. The level increases to the setpoint (e.g., 350 millimeters), and the valve will close. Immediately afterwards, the bowl level will decrease and trend negative, causing the Filler 108 to open the infeed valve again. Both the bowl level and the valve behavior begin to look like a sinusoidal curve. The system registers this behavior as a high fill rate and will increase the CPM by one. The Expert System 120 will then reevaluate these variables.

It is understood that the controllers and processors shown in the figures can include or be operatively coupled to a main memory and a non-volatile memory. The controllers and processors can be implemented as one or more of a multi-core processor, a digital signal processor (DSP), a microprocessor, a programmable controller, a programmable logic controller, a general-purpose computer, a special-purpose computer, a hardware controller, a software controller, a combined hardware and software device, such as a programmable logic controller, and a programmable logic device (e.g., FPGA, ASIC). The controllers and processors can include or be operatively coupled to main memory, such as RAM (e.g., DRAM, SRAM). The controllers and processors can include or be operatively coupled to non-volatile memory, such as ROM, EPROM, EEPROM or flash memory. Software, firmware, and coded instructions (e.g., machine learning models, algorithms) can be written using known coding techniques for execution by any of the processors, controllers or logic devices listed above.

In one or more examples, the functions and/or processes described herein may be implemented in hardware, software, firmware, or any combination thereof. If implemented in software, the functions may be stored on or transmitted over, as one or more instructions or code, a computer-readable medium and executed by a hardware-based processing unit (e.g., any of those listed above). Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to tangible computer-readable storage media which is non-transitory. Data storage media may be any available media that can be accessed by one or more computers or one or more processing circuits to retrieve instructions, code and/or data structures for implementation of the techniques described in this disclosure. A computer program product may include a computer-readable medium. By way of example, and not limitation, such computer-readable storage media can comprise RAM, ROM, EEPROM, CD-ROM or other optical disk storage, magnetic disk storage, or other magnetic storage devices, flash memory, cache memory, or any other medium that can be used to store desired program code in the form of instructions or data structures and that can be accessed by a computer.

Although reference is made herein to the accompanying set of drawings that form part of this disclosure, one of at least ordinary skill in the art will appreciate that various adaptations and modifications of the embodiments described herein are within, or do not depart from, the scope of this disclosure. For example, aspects of the embodiments described herein may be combined in a variety of ways with each other. Therefore, it is to be understood that, within the scope of the appended claims, the claimed invention may be practiced other than as explicitly described herein.

All references and publications cited herein are expressly incorporated herein by reference in their entirety into this disclosure, except to the extent they may directly contradict this disclosure. Unless otherwise indicated, all numbers expressing feature sizes, amounts, and physical properties used in the specification and claims may be understood as being modified either by the term "exactly" or "about." Accordingly, unless indicated to the contrary, the numerical parameters set forth in the foregoing specification and attached claims are approximations that can vary depending upon the desired properties sought to be obtained by those skilled in the art utilizing the teachings disclosed herein or, for example, within typical ranges of experimental error.

The recitation of numerical ranges by endpoints includes all numbers subsumed within that range (e.g. 1 to 5 includes 1, 1.5, 2, 2.75, 3, 3.80, 4, and 5) and any range within that range. Herein, the terms "up to" or "no greater than" a number (e.g., up to 50) includes the number (e.g., 50), and the term "no less than" a number (e.g., no less than 5) includes the number (e.g., 5).

The terms "coupled" or "connected" refer to elements being attached to each other either directly (in direct contact with each other) or indirectly (having one or more elements between and attaching the two elements). Either term may be modified by "operatively" and "operably," which may be used interchangeably, to describe that the coupling or connection is configured to allow the components to interact to carry out at least some functionality (for example, a radio chip may be operably coupled to an antenna element to provide a radio frequency electric signal for wireless communication).

Terms related to orientation, such as "top," "bottom," "side," and "end," are used to describe relative positions of components and are not meant to limit the orientation of the embodiments contemplated. For example, an embodiment described as having a "top" and "bottom" also encompasses embodiments thereof rotated in various directions unless the content clearly dictates otherwise.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

As used herein, "have," "having," "include," "including," "comprise," "comprising" or the like are used in their open-ended sense, and generally mean "including, but not limited to." It will be understood that "consisting essentially of," "consisting of," and the like are subsumed in "comprising," and the like. The term "and/or" means one or all of the listed elements or a combination of at least two of the listed elements.

The phrases "at least one of," "comprises at least one of," and "one or more of" followed by a list refers to any one of the items in the list and any combination of two or more items in the list.

What is claimed is:

1. A method implemented by an automated container fill line system, comprising:
    transporting a plurality of containers along a container fill line at a container fill line speed, wherein the container fill line includes equipment comprising a filler, upstream equipment situated upstream of the filler, and downstream equipment situated downstream of the filler;
    dispensing, by the filler, a material into each of the containers individually and sequentially; and
    controlling the container fill line speed by an Expert System using a set of hierarchical rules and one or more machine learning models, wherein the one or more machine learning models are associated with the upstream equipment and the downstream equipment.

2. The method according to claim 1, wherein the Expert System controls the container fill line speed in response to at least:
    a capacity of the equipment of the container fill line to process the containers; and
    a capacity of the filler of the container fill line to fill the containers while the containers are transported along the container fill line at the container fill line speed.

3. The method according to claim 1, comprising detecting, by the Expert System, whether the equipment is experiencing anomalous behavior using the one or more machine learning models.

4. The method according to claim 1, wherein the Expert System adjusts the container fill line speed by:
    increasing the container fill line speed in response to detecting non-violation of the hierarchical rules and detecting an absence of anomalous equipment behavior; and
    decreasing the container fill line speed in response to detecting violation of one or more of the hierarchical rules or detecting presence of anomalous equipment behavior.

5. The method according to claim 4, wherein:
    increasing the container fill line speed comprises increasing a current container fill line speed to achieve a throughput equivalent to a requested or maximum number of containers per minute processed by the container fill line; and
    decreasing the container fill line speed comprises reducing the current container fill line speed to achieve a throughput equivalent to a number of containers per minute ranging from zero to less than the requested or maximum number of containers per minute.

6. The method according to claim 1, wherein the one or more machine learning models define models trained using historical equipment speed data acquired during past operation of the equipment.

7. The method according to claim 1, wherein the set of hierarchical rules comprises a first set of rules directed to fill line process values that vary dynamically and a second set of rules directed to constant parameter values.

8. The method according to claim 1, wherein the Expert System integrates one or more new hierarchical rules into the set of hierarchical rules to provide for enhanced adjustment to the container fill line speed.

9. The method according to claim 1, comprising one or more of:
    writing alerts generated by the Expert System to a database and communicating the alerts from the database to a user interface in response to a user request or a system request;
    writing, by the Expert System to the database, events of predetermined relevance and information associated with the events; and
    writing, by the Expert System to the database, anomalies of predetermined relevance and information associated with the anomalies.

10. The method according to claim 1, comprising calculating, by the Expert System, statistics during operation of the container fill line and storing the statistics in a memory.

11. The method according to claim 1, wherein the material comprises liquid material or a semi-liquid material.

12. The method according to claim 1, wherein the material comprises a powder or an aerosolized material.

13. An automated container fill line system, comprising:
    a container fill line configured to transport a plurality of containers at a container fill line speed, wherein the container fill line includes equipment comprising a filler, upstream equipment situated upstream of the filler, and downstream equipment situated downstream of the filler;
    a filler configured to dispense a material into each of the containers individually and sequentially; and
    an Expert System configured to control the container fill line speed using a set of hierarchical rules and one or more machine learning models, wherein the one or more machine learning models are associated with the upstream equipment and the downstream equipment.

14. The system according to claim 13, wherein the Expert System is configured to control the container fill line speed in response to at least:

a capacity of the equipment of the container fill line to process containers; and a capacity of the filler of the container fill line to fill the containers while the containers are transported along the container fill line at the container fill line speed.

15. The system according to claim 13, wherein the Expert System is configured to detect whether the equipment is experiencing anomalous behavior using the one or more machine learning models.

16. The system according to claim 13, wherein the Expert System is configured to adjust the container fill line speed by:

increasing the container fill line speed in response to detecting non-violation of the hierarchical rules and detecting an absence of anomalous equipment behavior; and decreasing the container fill line speed in response to detecting violation of one or more of the hierarchical rules or detecting presence of anomalous equipment behavior.

17. The system according to claim 13, wherein the Expert System is configured to:

increase the container fill line speed by increasing a current container fill line speed to achieve a throughput equivalent to a requested or maximum number of containers per minute processed by the container fill line; and decrease the container fill line speed by reducing the current container fill line speed to achieve a throughput equivalent to a number of containers per minute ranging from zero to less than the requested or maximum number of containers per minute.

18. The system according to claim 13, wherein the one or more machine learning models define models trained using historical equipment speed data acquired during past operation of the equipment.

19. The system according to claim 13, wherein the set of hierarchical rules comprises a first set of rules directed to fill line process values that vary dynamically and a second set of rules directed to constant parameter values.

20. The system according to claim 13 wherein the Expert System is configured to integrate one or more new hierarchical rules into the set of hierarchical rules to provide for enhanced adjustment to the container fill line speed.

21. The system according to claim 13, wherein the Expert System is operably coupled to a database and configured to one or more of:

write alerts to the database and communicate the alerts from the database to a user interface in response to a user request or a system request;

write events of predetermined relevance and information associated with the events to the database; and write anomalies of predetermined relevance and information associated with the anomalies to the database.

22. The system according to claim 13, wherein the Expert System is configured to calculate statistics during operation of the container fill line and store the statistics in a memory.

23. The system according to claim 13, wherein the material comprises a liquid material or a semi-liquid material.

24. The system according to claim 13, wherein the material comprises a powder or an aerosolized material.

25. A non-transient computer readable medium containing program instructions for causing a computer-implemented Expert System to:

control transporting of a plurality of containers along a container fill line at a container fill line speed, wherein the container fill line includes equipment comprising a filler, upstream equipment situated upstream of the filler, and downstream equipment situated downstream of the filler;

control dispensing of a material, by the filler, into each of the containers individually and sequentially; and control the container fill line speed using a set of hierarchical rules and one or more machine learning models, wherein the one or more machine learning models are associated with the upstream equipment and the downstream equipment.

26. The non-transient computer readable medium according to claim 25, wherein the Expert System controls the container fill line speed in response to at least:

a capacity of the equipment of the container fill line to process unfilled containers; and a capacity of the filler of the container fill line to fill the containers while the containers are transported along the container fill line at the container fill line speed.

27. The non-transient computer readable medium according to claim 25, wherein the instructions cause the Expert System to detect whether the equipment is experiencing anomalous behavior using the one or more machine learning models.

28. The non-transient computer readable medium according to claim 25, wherein the instructions cause the Expert System to adjust the container fill line speed at least in part by:

increasing the container fill line speed in response to detecting non-violation of the hierarchical rules and detecting an absence of anomalous equipment behavior; and decreasing the container fill line speed in response to detecting violation of one or more of the hierarchical rules or detecting presence of anomalous equipment behavior.

29. The non-transient computer readable medium according to claim 25, wherein the instructions cause the Expert System to:

increase the container fill line speed by increasing a current container fill line speed to achieve a throughput equivalent to a requested or maximum number of containers per minute processed by the container fill line; and decrease the container fill line speed by reducing the current container fill line speed to achieve a throughput equivalent to a number of containers per minute ranging from zero to less than the requested or maximum number of containers per minute.

* * * * *